US009868807B2

(12) United States Patent
Blok et al.

(10) Patent No.: US 9,868,807 B2
(45) Date of Patent: Jan. 16, 2018

(54) SILANE-FUNCTIONALIZED HYDROCARBON POLYMER MODIFIERS FOR ELASTOMERIC COMPOSITIONS

(71) Applicant: ExxonMobil Chemical Patents Inc., Baytown, TX (US)

(72) Inventors: Edward J. Blok, Huffman, TX (US); Anthony J. Dias, Houston, TX (US); Robert J. Claassen, II, Baytown, TX (US); Eugene R. Uhl, Massillon, OH (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/165,241

(22) Filed: May 26, 2016

(65) Prior Publication Data

US 2016/0264689 A1 Sep. 15, 2016

Related U.S. Application Data

(62) Division of application No. 13/822,103, filed as application No. PCT/US2011/049139 on Aug. 25, 2011, now Pat. No. 9,376,566.

(60) Provisional application No. 61/508,226, filed on Jul. 15, 2011, provisional application No. 61/508,238, filed on Jul. 15, 2011, provisional application No. 61/392,751, filed on Oct. 13, 2010, provisional application No. 61/392,765, filed on Oct. 13, 2010.

(51) Int. Cl.
| | |
|---|---|
| *C08F 279/00* | (2006.01) |
| *C08L 101/10* | (2006.01) |
| *B29B 9/06* | (2006.01) |
| *B60C 1/00* | (2006.01) |
| *C08C 19/25* | (2006.01) |
| *C08J 3/12* | (2006.01) |
| *C08L 23/22* | (2006.01) |
| *B29D 30/06* | (2006.01) |
| *C08K 3/36* | (2006.01) |
| *C08L 45/00* | (2006.01) |
| *C08L 47/00* | (2006.01) |
| *C08L 101/02* | (2006.01) |
| *C08F 8/42* | (2006.01) |
| *C08L 51/00* | (2006.01) |
| *C08F 10/14* | (2006.01) |
| *B29K 9/00* | (2006.01) |

(52) U.S. Cl.
CPC ............ *C08F 279/00* (2013.01); *B29B 9/065* (2013.01); *B29D 30/06* (2013.01); *B60C 1/00* (2013.01); *B60C 1/0008* (2013.04); *B60C 1/0016* (2013.04); *B60C 1/0041* (2013.04); *C08C 19/25* (2013.01); *C08F 8/42* (2013.01); *C08J 3/12* (2013.01); *C08K 3/36* (2013.01); *C08L 23/22* (2013.01); *C08L 45/00* (2013.01); *C08L 47/00* (2013.01); *C08L 51/003* (2013.01); *C08L 101/02* (2013.01); *C08L 101/10* (2013.01); *B29K 2009/00* (2013.01); *C08F 10/14* (2013.01); *C08J 2351/00* (2013.01); *Y02T 10/862* (2013.01); *Y10T 156/10* (2015.01)

(58) Field of Classification Search
CPC ......... C08L 101/10; C08L 47/00; C08L 45/00
See application file for complete search history.

(56) References Cited

U.S. PATENT DOCUMENTS

| | | | | | |
|---|---|---|---|---|---|
| 3,929,850 | A | * | 12/1975 | Streck | ..................... C08C 19/28 525/105 |
| 4,060,503 | A | * | 11/1977 | Feeney | ............... C08F 236/045 427/208.4 |
| 4,065,444 | A | * | 12/1977 | Delaney | ............... C08F 236/045 152/450 |
| 4,246,359 | A | * | 1/1981 | Whelan | .................... C08K 3/22 521/139 |

(Continued)

FOREIGN PATENT DOCUMENTS

| | | |
|---|---|---|
| EP | 2213687 | 8/2010 |
| EP | 2213688 | 8/2010 |

(Continued)

OTHER PUBLICATIONS

"Escorez Hydrocarbon Tackifier Resins", The Society of Adhesions & Interface, Korea Aug. 1, 2008, Retrieved from the internet: URL:http://210.94.182.55/activities/atsem02/atesem02-abh.pdf, pp. 5-13.

*Primary Examiner* — Liam J Heincer
(74) *Attorney, Agent, or Firm* — Priya G. Prasad

(57) ABSTRACT

An elastomeric composition and method incorporating a hydrocarbon polymer modifier with improved permanence. The composition comprises elastomer, filler and silane-functionalized hydrocarbon polymer modifier (Si-HPM) adapted to couple the Si-HPM to the elastomer, filler or both, wherein the Si-HPM comprises an interpolymer of monomers chosen from piperylenes, cyclic pentadienes, aromatics, limonenes, pinenes, amylenes, and combinations thereof. The method comprises melt processing a mixture to form the elastomeric composition in the shape of an article, wherein the mixture comprises elastomer, Si-HPM, silica, bifunctional organosilane crosslinking agent; and curing the elastomeric composition to form the article. Also disclosed are a silylated hydrocarbon polymer modifier coupled with a bifunctional organosilane crosslinking agent, and a silica-coupled hydrocarbon polymer modifier coupled to the silica via the bifunctional organosilane crosslinking agent.

5 Claims, No Drawings

(56) References Cited

U.S. PATENT DOCUMENTS

| | | | | |
|---|---|---|---|---|
| 4,273,896 A * | 6/1981 | Martin | C08F 297/02 | 525/106 |
| 4,559,387 A * | 12/1985 | Endo | C08C 19/38 | 525/102 |
| 4,719,260 A | 1/1988 | Stuart, Jr. et al. | | |
| 5,439,974 A | 8/1995 | Mattson | | |
| 5,451,637 A | 9/1995 | Leibfried | | |
| 5,804,253 A * | 9/1998 | Hagiwara | C08K 9/08 | 156/182 |
| 6,025,445 A * | 2/2000 | Chiba | C08L 101/10 | 525/326.5 |
| 6,201,059 B1 * | 3/2001 | Wideman | B60C 1/0016 | 152/450 |
| 6,214,919 B1 * | 4/2001 | Schlademan | B60C 1/00 | 152/450 |
| 6,228,944 B1 * | 5/2001 | Blok | C08F 232/08 | 152/548 |
| 6,258,878 B1 * | 7/2001 | Bahadur | C08K 5/0025 | 524/107 |
| 6,265,478 B1 * | 7/2001 | Kralevich, Jr. | B60C 1/0016 | 152/209.5 |
| 6,357,499 B1 * | 3/2002 | Kralevich, Jr. | C08F 232/00 | 152/209.1 |
| 6,525,133 B1 * | 2/2003 | Wideman | B60C 1/0016 | 152/209.1 |
| 7,259,221 B2 | 8/2007 | Durairaj et al. | | |
| 7,276,557 B2 | 10/2007 | Macedo et al. | | |
| 7,279,528 B2 | 10/2007 | Macedo et al. | | |
| 7,294,664 B2 | 11/2007 | Jones et al. | | |
| 8,013,054 B2 * | 9/2011 | Rodgers | B60C 1/0008 | 524/445 |
| 2002/0048680 A1 * | 4/2002 | Yamanaka | C08K 5/0091 | 428/447 |
| 2002/0137869 A1 * | 9/2002 | Sakamoto | C08L 23/26 | 528/10 |
| 2003/0114620 A1 * | 6/2003 | Cottman | C08F 210/14 | 526/291 |
| 2003/0119965 A1 * | 6/2003 | Galimberti | B60C 1/0016 | 524/492 |
| 2004/0051210 A1 * | 3/2004 | Tardivat | B60C 1/0016 | 264/349 |
| 2004/0092644 A1 * | 5/2004 | Labauze | B60C 1/0016 | 524/492 |
| 2005/0137361 A1 * | 6/2005 | Sakamoto | C08K 5/544 | 525/474 |
| 2005/0277723 A1 * | 12/2005 | Gong | C08K 3/346 | 524/445 |
| 2006/0004138 A1 * | 1/2006 | Mathieu | B60C 1/0016 | 524/518 |
| 2006/0089430 A1 * | 4/2006 | Kawakami | C08L 95/00 | 524/59 |
| 2006/0100339 A1 * | 5/2006 | Gong | B82Y 30/00 | 524/445 |
| 2006/0167160 A1 | 7/2006 | Nakagawa et al. | | |
| 2007/0082991 A1 * | 4/2007 | Chassagnon | B29D 30/52 | 524/313 |
| 2007/0105998 A1 * | 5/2007 | Gong | B60C 1/0008 | 524/236 |
| 2007/0123636 A1 * | 5/2007 | Hattori | B60C 1/0016 | 524/515 |
| 2008/0009564 A1 * | 1/2008 | Robert | B60C 1/0016 | 523/351 |
| 2008/0057153 A1 * | 3/2008 | Cosgrove | A23G 4/08 | 426/4 |
| 2008/0317990 A1 | 12/2008 | Runyan et al. | | |
| 2009/0186965 A1 * | 7/2009 | Rodgers | B60C 1/0016 | 524/52 |
| 2009/0292063 A1 * | 11/2009 | Robert | B60C 1/0016 | 524/518 |
| 2010/0036025 A1 * | 2/2010 | Rodgers | B60C 1/0008 | 524/52 |
| 2010/0139825 A1 * | 6/2010 | Hetzel | B29C 73/02 | 152/209.1 |
| 2010/0186859 A1 | 7/2010 | Zhao et al. | | |
| 2010/0298467 A1 * | 11/2010 | Stammer | C09J 143/04 | 523/218 |
| 2011/0136970 A1 * | 6/2011 | Koster | C08K 3/36 | 524/578 |
| 2011/0213058 A1 * | 9/2011 | Yano | C08G 18/4854 | 524/115 |
| 2012/0065292 A1 * | 3/2012 | Lopitaux | B60C 1/0016 | 523/150 |
| 2013/0184397 A1 * | 7/2013 | Blok | B60C 1/00 | 524/518 |
| 2013/0211027 A1 * | 8/2013 | Barbee | C08F 232/06 | 526/283 |
| 2016/0289352 A1 * | 10/2016 | Blok | B60C 1/0016 | |
| 2017/0058057 A1 * | 3/2017 | Blok | C08F 8/00 | |
| 2017/0058058 A1 * | 3/2017 | Blok | C08L 21/00 | |
| 2017/0066898 A1 * | 3/2017 | Harris | C08G 61/02 | |

FOREIGN PATENT DOCUMENTS

| | | |
|---|---|---|
| FR | 2007/017060 | 2/2007 |
| JP | 55-73716 A | 6/1980 |
| JP | 2002-284879 | 10/2002 |
| JP | 2004-059599 | 2/2004 |
| JP | 2008-184505 A | 8/2008 |
| KR | 10-2003-0046505 | 6/2003 |
| WO | 96/23845 | 8/1996 |
| WO | 2004-044051 | 5/2004 |
| WO | 2004-044052 | 5/2004 |

\* cited by examiner

SILANE-FUNCTIONALIZED HYDROCARBON POLYMER MODIFIERS FOR ELASTOMERIC COMPOSITIONS

CROSS REFERENCE TO RELATED APPLICATIONS

This patent application is a divisional application of U.S. application Ser. No. 13/822,103, filed May 3, 2013, which is a National Stage Application of International Application No. PCT/US2011/049139 filed Aug. 25, 2011, which claims priority to and the benefit of U.S. Ser. No. 61/508,226, filed Jul. 15, 2011; U.S. Ser. No. 61/508,238, filed Jul. 15, 2011, corresponding to U.S. Ser. No. 13/821,683, now U.S. Publication No. 2013-0220516); U.S. Ser. No. 61/392,751, filed Oct. 13, 2010, corresponding to U.S. Ser. No. 13/822,651, now U.S. Pat. No. 8,653,195; and U.S. Ser. No. 61/392,765, filed Oct. 13, 2010, corresponding to U.S. Ser. No. 13/821, 715, now U.S. Pat. No. 8,735,500. This application is also related to U.S. Ser. No. 12/345,154, filed Dec. 29, 2008, now U.S. Pat. No. 9,062,189, which claims priority to and the benefit of U.S. Ser. No. 61/022,122, filed Jan. 18, 2008.

BACKGROUND (1) Field of the Invention

This invention relates to hydrocarbon polymer modifiers and their use in elastomeric compositions. More particularly, this invention relates to the use of hydrocarbon polymer modifiers in cured elastomeric compositions.

(2) Description of Related Art Including Information Disclosed Under 37 CFR 1.97-1.98

The selection of ingredients for the commercial formulation of an elastomeric composition depends upon the balance of properties desired, the application, and the end use for the particular application. For example, in the tire industry the balance between processing properties of the green (uncured) composition in the tire plant and in-service performance of the cured rubber tire composite is of particular importance. Conventional oil processing aids have been used in many tire components: tread compounds often contain polybutadiene rubber ("BR"), oil-extended polybutadiene rubber ("OE-BR"), styrene-butadiene rubber ("SBR"), oil-extended styrene-butadiene rubber ("OE-SBR"), isoprene-butadiene rubber ("IBR"), and styrene-isoprene-butadiene rubber ("SIBR"); sidewall and ply coats can contain butyl rubber and SBR and have used free aromatic oils as processing aids; internal components, such as the steel belt skim coat, gum strips, cushions, barriers, bases, and wedges, contain predominantly natural rubber and have used aromatic oils.

Generally, the raw ingredients and materials used in tire compounding impact all tire performance variables, thus, any new alternative to conventional processing oils must be compatible with the rubbers, not interfere with cure, be easily dispersed in all tire compounds, be cost effective, and not adversely impact tire performance. Rolling resistance, dry and wet skid characteristics, heat buildup, and so on are important performance characteristics, as well as the ability to improve the endurance of tires used in a wide variety of conditions, such as is required for agricultural tires, aircraft tires, earthmover tires, heavy-duty truck tires, mining tires, motorcycle tires, medium truck tires, and passenger car tires. On the other hand, maintaining ease of processability of the uncured elastomeric composition is also of significant importance. Additionally, there still remain the goals of improving air impermeability properties, flex fatigue properties, and the adhesion of the elastomeric composition to adjoining tire components without affecting the processability of the uncured elastomeric composition or while maintaining or improving the physical property performance of the cured elastomeric composition.

It is also known to improve tire tread performance by compounding amorphous or semicrystalline resins in the rubber base to improve tire performance, e.g., aliphatic resins having a high glass transition temperature (Tg). These materials can be miscible, which increases compound Tg for better wet traction, have some degree of immiscibility, which broadens compound Tg in wet traction region, or be immiscible in one or all of the polymers used, which has relatively no effect on the compound Tg. The immiscibility can be demonstrated by independent Tg peaks for the two different phases, i.e., the Tg corresponding to the rubber phase is not significantly changed by the immiscible resin. Tread compositions based on these formulations can have a low rolling resistance at normal use temperatures and/or a high grip at high temperature or "borderline" conditions.

Unfortunately, high concentrations of low molecular weight additives in general and immiscible resins in particular can migrate to the surface of the tread or other tire components over time, which can dramatically change the rubber compound characteristics and/or tire performance. When the Tg of the tire compound is increased by the addition of a miscible, high Tg additive, the wet traction improves while the treadwear and rolling resistance are negatively impacted.

There is thus a need for improving the permanence of rubber compounding additives in general, and for improving wet traction in a tire tread while maintaining or improving treadwear and rolling resistance.

SUMMARY

The present invention provides in one embodiment an elastomeric composition comprising a hydrocarbon polymer modifier ("HPM"). In an embodiment, the HPM is functionalized with at least one functional group, and in another embodiment, the at least one functional group comprises a silane structure to provide at least one silane-functionalized hydrocarbon polymer modifier ("Si-HPM"). The Si-HPM is anchored or anchorable via the functional group(s) to another component in the elastomeric composition, e.g., a filler and/or polymer depending on the nature of the functional group(s), significantly improving long term elastomeric performance, e.g., in a tire or tire component. The elastomeric compositions of the present invention are useful in a variety of applications such as pneumatic tire components, hoses, belts, solid tires, footwear components, rollers for graphic arts applications, vibration isolation devices, pharmaceutical devices, adhesives, sealants, protective coatings, and bladders for fluid retention and curing purposes. In tire tread compounds, one embodiment of the present invention allows the tire compounder to improve the wet traction with the use of a high-Tg HPM while maintaining or improving tread wear and rolling resistance through improved filler dispersion.

DETAILED DESCRIPTION

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The term "phr" means parts per hundred parts of rubber by weight, and is a measure common in the art wherein components of a composition are measured relative to the total of all of the elastomer (rubber) components. The total phr or parts for all rubber components, whether one, two, three, or more different rubber components are present in a given recipe is always defined as 100 phr. Other non-rubber components are generally proportional to the 100 parts of rubber and the relative amounts may be expressed in phr. The term "olefinic hydrogen" means hydrogen adjacent to an olefinic double bond. The term "aromatic hydrogen" is based on the total moles of hydrogen in the interpolymer as determined by proton nuclear magnetic resonance (H-NMR).

The term "silane" means any silicon analog of a substituted or unsubstituted alkane hydrocarbon. The term "silane structure" refers to any compound, moiety or group containing a tetravalent silicon atom. The term "interpolymer" means any polymer or oligomer having a number average molecular weight of 500 or more prepared by the polymerization or oligomerization of at least two different monomers, including copolymers, terpolymers, tetrapolymers, etc. As used herein, reference to monomers in an interpolymer is understood to refer to the as-polymerized and/or as-derivatized units derived from that monomer. The terms polymer and interpolymer are used broadly herein and in the claims to encompass higher oligomers having a number average molecular weight (Mn) equal to or greater than 500, as well as compounds that meet the molecular weight requirements for polymers according to classic ASTM definitions.

All hydrocarbon polymer modifier component percentages listed herein are weight percentages, unless otherwise noted. "Substantially free" of a particular component in reference to a composition is defined to mean that the particular component comprises less than 0.5 wt % in the composition, or more preferably less than 0.25 wt % of the component in the composition, or most preferably less than 0.1 wt % of the component in the composition.

The term "elastomer" as used herein refers to any polymer or combination of polymers consistent with the ASTM D1566 definition, incorporated herein by reference. As used herein, the term "elastomer" may be used interchangeably with the term "rubber."

As used herein, "immiscibility" is present when experimental techniques to observe the glass transition temperature (Tg) show distinct separate and independent peaks for the elastomer and the interpolymer. Miscible systems on the other hand generally result in a single Tg peak which is shifted from the Tg peak for the elastomer alone, or which has a shoulder, due to the presence of the miscible interpolymer in the elastomer phase. Tg can be determined by differential scanning calorimetry ("DSC").

The term "filler" as used herein refers to any material are used to reinforce or modify physical properties, impart certain processing properties, or reduce cost of an elastomeric composition.

The elastomeric compositions of the invention can include various elastomers, hydrocarbon polymer modifiers, fillers and, in some embodiments, a bifunctional organosilane crosslinking agent, which can optionally be pre-reacted with the modifier, the filler, the elastomer, or any combination thereof.

In an embodiment, the hydrocarbon polymer modifier is functionalized, i.e., a functionalized hydrocarbon polymer modifier, with one or more functional groups for coupling the hydrocarbon polymer modifier to the at least one elastomer, to the at least one filler or to both the at least one elastomer and the at least one filler. For example, where the filler comprises silica, the functional groups can have a silane structure, and/or the functional groups can have a structure, such as olefinic unsaturation, which is suitable for silylation to incorporate a silane structure either as a pre-reaction or dynamically during elastomer processing, or the silane structure can be incorporated by including a silane-functional monomer in the interpolymerization of the modifier monomers.

In an embodiment, the hydrocarbon polymer modifier can be functionalized using a bifunctional organosilane crosslinking agent comprising a silicon functional group and an organo-functional group. The organo-functional group can be used to couple one end of the crosslinking agent to the hydrocarbon polymer modifier at a reactive binding site, e.g., via olefinic unsaturation or incorporated during interpolymerization. The silicon functional groups can be used to bind the other end of the crosslinking agent to the silica filler, effectively anchoring the hydrocarbon polymer modifier in the elastomeric matrix. The hydrocarbon polymer modifier can also be grafted to the elastomer or otherwise bound, for example, via additional olefinically unsaturated sites in the elastomer and the modifier.

In one embodiment, the elastomeric composition is used in a tire, such as in the tread, or other tire component. In tire construction and model tread formulations, the elastomeric composition may comprise: 100 phr of elastomer(s); from 50 to 90 phr of silica and optionally other fillers such as, for example, carbon black; from 5 to 50 phr of functionalized hydrocarbon polymer modifier(s); optionally, about 0.5 to 3 phr of ZnO; optionally, about 1 phr of stearic acid; optionally, about 1 to 4 phr of accelerators; optionally, about 1 to 2 phr of sulfur; optionally, up to about 5 phr of other processing aids; and optionally, depending on the application, about 0.5 to 4 phr of antidegradants.

In another embodiment, the elastomeric composition may comprise: 100 phr of elastomer(s); from 50 to 90 phr of silica and optionally other fillers such as, for example, carbon black; from 5 to 50 phr of hydrocarbon polymer modifier(s) comprising from 1 to 10 mole percent olefinic hydrogen, based on the total moles of hydrogen in the hydrocarbon polymer modifier; from 0.1 to 8 phr of a bifunctional organosilane crosslinking agent; optionally, about 0.5 to 3 phr of ZnO; optionally, about 1 phr of stearic acid; optionally, about 1 to 4 phr of accelerators; optionally, about 1 to 2 phr of sulfur; optionally, up to about 5 phr of other processing aids; and optionally, depending on the application, about 0.5 to 4 phr of antidegradants.

In some embodiments, the hydrocarbon polymer modifier(s) can be used in addition to other processing aids and oils, or as a replacement for other processing aids and oils. Preferably, the elastomeric compositions are substantially free of aromatic oils. Substantially free of aromatic oils is defined to mean that the elastomeric composition comprises less than 0.5 phr of aromatic oil, or more preferably less than 0.25 phr of aromatic oil, or most preferably less than 0.1 phr of aromatic oil. Aromatic oils are compounds containing at least 35% by mass of single- and multiple-ring compounds. Generally, aromatic oils contain aromatically unsaturated polycyclic components.

In some embodiments, replacing aromatic oil with hydrocarbon polymer modifier(s) can improve compound tack, adhesion, and tear strength; improve aged tensile strength retention; improve abrasion resistance and storage modulus, G'; provide an increase in tan delta at 0° C., which can be used as a predictor for wet tire traction; provide an increase in tan delta within the range of from 30° C. to 70° C., which can be used as an indicator of dry traction, rolling resistance and other enhanced performance characteristics under normal use conditions; or provide an increase in tan delta above 70° C., which can be used as an indicator of tire grip and other enhanced performance characteristics under extreme use conditions; or any combination of any two or more or all of these improvements.

In some embodiments, the hydrocarbon polymer modifiers can be miscible or immiscible in the elastomer. Immiscibility can result, for example, where the solubility parameters of the elastomer and the HPM are sufficiently different, i.e., the HPM is incompatible with the elastomer. In another embodiment, the HPM can have a sufficiently high molecular weight to confer immiscibility in an elastomeric matrix, even where the HPM would be compatible with the elastomer mix due to similar solubility parameters and otherwise miscible if the molecular weight were lower.

In some embodiments, the Si-HPM is co-curable or co-cured with the elastomer. The Si-HPM in one embodiment comprises olefinic unsaturation (in excess of that required for any silylation or other functionalization) or other functionality that facilitates participation in the crosslinking or vulcanization of the rubber mixture. In one embodiment, the Si-HPM is co-curable or co-cured with filler in the elastomeric composition, for example, with silica filler. Co-curing the Si-HPM, which can be either miscible or immiscible in the elastomer, can further inhibit migration of the Si-HPM to a surface of the cured rubber article, thus allowing the rubber composition to retain its desired properties for a longer period of time up to the useful lifetime of the article.

The Si-HPM in one embodiment can be manufactured in a one-step process by adding monomers to the reactor or modification of the finishing line. In another embodiment, the Si-HPM can be produced in a post-reactor process, e.g., a post-reactor, pre-compounding process. In one particular embodiment, silanes capable of reacting or interacting with the filler and curing into the elastomer matrix are included in the compounding formulation or process. In another embodiment, the Si-HPM can be coupled to the filler, optionally without reacting with the elastomer or cure system. The final products present in the elastomer composition in various embodiments can include elastomer-resin-filler complexes, resin-filler complexes, elastomer-resin-elastomer complexes, elastomer-filler complexes, combinations thereof, and the like.

In one embodiment, an elastomeric composition comprises at least one elastomer, at least one filler and at least one silane-functionalized hydrocarbon polymer modifier. The Si-HPM in an embodiment comprises an interpolymer comprising at least one monomer chosen from piperylenes, cyclic pentadienes, aromatics, limonenes, pinenes, and amylenes, and can include at least one functional group to couple the Si-HPM to the at least one filler, or to both the at least one elastomer and the at least one filler to the at least one elastomer. In another embodiment, the HPM comprises interpolymerized monomers selected from the group consisting of piperylenes, cyclic pentadienes, aromatics, limonenes, pinenes, amylenes, terpenes, and combinations thereof.

In one embodiment, the one or more functional groups further comprise olefinic unsaturation, wherein the functionalized interpolymer comprises at least 1 mole percent olefinic hydrogen, based on the total moles of hydrogen in the interpolymer. In another embodiment, the silane structure can be provided, for example, by silylation at sites of olefinic unsaturation in the interpolymer with a bifunctional organosilane compound, either before or after combining the interpolymer with the elastomer and/or the filler.

In another embodiment, the Si-HPM comprises the reaction product of the interpolymer and a bifunctional organosilane crosslinking agent of the formula $X_3Si-R-F-[R-Si-X_3]_p$ wherein each X is independently a silicon functional group, each R is independently a divalent substituted or unsubstituted hydrocarbon group of from 1 to 20 carbon atoms, F is a monovalent or multivalent organofunctional group, p is 0 when F is monovalent and p is at least 1 when F is multivalent. In one embodiment, X is hydroxy or $R^1-O-$ wherein $R^1$ is an alkyl, alkoxyalkyl, aryl, aralkyl or cycloalkyl group of up to 20 carbon atoms, R is alkylene, and when p is 0 F is selected from amino, amido, hydroxy, alkoxy, halo, mercapto, hydrosilyl, carboxy, acyl, vinyl, allyl, styryl, ureido, epoxy, isocyanato, glycidoxy, and acryloxy groups, and when p is 1 F is divalent polysulfide of from 2 to 20 sulfur atoms.

In an embodiment, the at least one filler comprises silica.

In one embodiment, the interpolymer comprises: (i) at least one piperylene component; (ii) at least one cyclic pentadiene component; and (iii) at least one aromatic component, wherein the interpolymer comprises a softening point from 40° C. to 160° C. As one example, the interpolymer can have a softening point from 110° C. to 150° C., number average molecular weight greater than 800, weight average molecular weight greater than 2500, z average molecular weight greater than 20,000 and at least 5 mole percent aromatic hydrogen.

In another embodiment, the interpolymer comprises: (i) a piperylene component; (ii) an aromatic component; and (iii) a cyclic pentadiene component comprising a dicyclopentadiene fraction (DCPD fraction) and a dimethylcyclopentadiene fraction (MCPD fraction), wherein a weight ratio of the MCPD fraction to the DCPD fraction is from 0.8:1 to 100:1, wherein the MCPD fraction is at least 20 wt % of the cyclic pentadiene component, and wherein the interpolymer comprises: (a) Mn greater than 400; (b) Mz less than 15,000; and (c) at least 8 mole percent aromatic hydrogen, based on the total moles of hydrogen in the interpolymer.

In other embodiments, the interpolymer is prepared from a monomer mixture comprising from 60 wt % to 90 wt % piperylene components, from 5 wt % to 15 wt % cyclic components, and from 5 wt % to 20 wt % aromatic components, by weight of the monomer mixture; or additionally or alternatively, the interpolymer has a weight average molecular weight of from 520 to 650 g/mole and a Tg of from 48° C. to 53° C.

In various embodiments, the interpolymer is coupled via at least one of the one or more functional groups to the at least one elastomer, the interpolymer is coupled via at least one of the one or more functional groups to the at least one filler, the interpolymer is coupled via at least one of the one or more functional groups to a combination of the at least one elastomer and the at least one filler, the at least one elastomer is coupled to the at least one filler or any combination thereof, or the like.

In an embodiment, the interpolymer is immiscible with the at least one elastomer. In another embodiment, the functionalized hydrocarbon polymer modifier is present at from 5 to 50 phr.

In another embodiment, a tire or tire component comprises the elastomeric composition described herein.

In a further embodiment, a method comprises: melt processing an elastomeric mixture to form an elastomeric composition in the shape of an article, wherein the elastomeric mixture comprises: (i) at least one elastomer; (ii) at least one hydrocarbon polymer modifier wherein the hydrocarbon polymer modifier comprises an interpolymer comprising at least one monomer chosen from piperylenes, cyclic pentadienes, aromatics, limonenes, pinenes, and amylenes; (iii) a filler comprising silica; (iv) a bifunctional organosilane crosslinking agent; and curing the elastomeric composition to form the article.

In various embodiments, the method comprises: coupling the bifunctional organosilane crosslinking agent to the filler and one or both of the elastomer and the interpolymer; coupling the interpolymer to the elastomer; binding the interpolymer to the filler; or a combination thereof. In one embodiment, the method comprises coupling the interpolymer to one or both of the elastomer and the filler, coupling the elastomer to one or both of the interpolymer and the filler, and coupling the filler to one or both of the interpolymer and the elastomer.

In an embodiment, the method comprises pre-reacting the interpolymer and the bifunctional organosilane crosslinking agent. For example, the pre-reaction can comprise contacting the interpolymer and the bifunctional organosilane crosslinking agent in the presence of a catalyst, e.g., in an extruder. Alternatively or additionally, the pre-reaction comprises incorporating the bifunctional organosilane crosslinking agent in a mixture of the monomers in a feed to a polymerization reactor. In a further embodiment, the method comprises coupling the pre-reacted interpolymer-bifunctional organosilane crosslinking agent to the filler.

In a further embodiment, the interpolymer comprises at least 1 mole percent olefinic hydrogen, based on the total moles of hydrogen in the interpolymer. In one embodiment, the interpolymer is hydrogenated to reduce the extent of end vinyl groups, and in another embodiment, the interpolymer is not hydrogenated to provide end vinyl groups for coupling via silane or other intermediate functionalization.

In an embodiment of the method, the modifier is present in the elastomeric mixture in a form and an amount effective to lower the Mooney viscosity.

In an embodiment, the method can further comprise adhering a build component to a surface of the elastomeric composition and co-curing the build component with the article to form a construct. In an embodiment, the construct comprises a tire and the article comprises a tire tread, a tire innerliner, or a tire carcass.

In a further embodiment, a silylated hydrocarbon polymer modifier comprises interpolymerized monomers selected from the group consisting of piperylenes, cyclic pentadienes, aromatics, limonenes, pinenes, amylenes, and combinations thereof, coupled with a bifunctional organosilane crosslinking agent. In an embodiment, the silylated interpolymer comprised pendant silane groups having the formula $X_3Si-R-$ wherein each X is independently a silicon functional group and R is a divalent hydrocarbon group of from 1 to 20 carbon atoms. In one embodiment, X is hydroxy or $R^1-O-$, wherein $R^1$ is an alkyl, alkoxyalkyl, aryl, aralkyl or cycloalkyl group of up to 20 carbon atoms, and R is alkylene.

In a further embodiment, a silica-coupled hydrocarbon polymer modifier comprises an interpolymer comprising at least one monomer chosen from piperylenes, cyclic pentadienes, aromatics, limonenes, pinenes, and amylenes, wherein the functionalized interpolymer comprises at least 1 mole percent olefinic hydrogen, based on the total moles of hydrogen in the interpolymer, bound to silica via the bifunctional organosilane crosslinking agent. In an embodiment, the bifunctional organosilane crosslinking agent is a silane having the formula $X_3Si-R-F$ wherein each X is independently hydroxy or $R^1-O-$ wherein $R^1$ is an alkyl, alkoxyalkyl, aryl, aralkyl, or cycloalkyl group of up to 20 carbon atoms, R is alkylene of from 1 to 20 carbon atoms, and F is selected from amino, amido, hydroxy, alkoxy, halo, mercapto, hydrosilyl, carboxy, acyl, vinyl, allyl, styryl, ureido, epoxy, isocyanato, glycidoxy, and acryloxy groups, and combinations thereof. In another embodiment, the bifunctional organosilane crosslinking agent is a silane having the formula $X_3Si-R-F-R-Si-X_3$ wherein each X is independently hydroxy or $R^1-O-$ wherein $R^1$ is an alkyl, alkoxyalkyl, aryl, aralkyl, or cycloalkyl group of up to 20 carbon atoms, each R is alkylene of from 1 to 20 carbon atoms, and F is divalent polysulfide of from 2 to 20 sulfur atoms. In another embodiment, the interpolymer is co-cured with an elastomer via the olefinic unsaturation in the interpolymer.

Elastomer

The elastomeric composition comprises at least one elastomer. In one embodiment, a single one or a mixture of two or more of the various elastomers are generally present in the elastomeric composition at 100 phr with hydrocarbon polymer modifier being present at from 5 to 50 phr.

Typical elastomers that may be included in the elastomeric compositions include butyl rubber, branched ("star-branched") butyl rubber, star-branched polyisobutylene rubber, random copolymers of isobutylene and para-methylstyrene (poly(isobutylene-co-p-methylstyrene)), random copolymers of isoprene, isobutylene and alkyl styrene, polybutadiene rubber ("BR"), high cis-polybutadiene, polyisoprene rubber, isoprene-butadiene rubber ("IBR"), styrene-isoprene-butadiene rubber ("SIBR"), styrene-butadiene rubber ("SBR"), solution-styrene-butadiene rubber ("sSBR"), emulsion-styrene-butadiene rubber, nitrile rubber, ethylene propylene rubber ("EP"), ethylene-propylene-diene rubber ("EPDM"), synthetic-polyisoprene, general purpose rubber, natural rubber, and any halogenated versions of these elastomers and mixtures thereof. Useful elastomers can be made by any suitable means known in the art, and the invention is not herein limited by the method of producing the elastomer.

The elastomer may or may not be halogenated. Preferred halogenated elastomers may be selected from the group consisting of halogenated butyl rubber, bromobutyl rubber, chlorobutyl rubber, halogenated branched ("star-branched") butyl rubbers, and halogenated random copolymers of isobutylene and para-methylstyrene. Such elastomer blends are generally used for barrier components in tires.

In some embodiments, the elastomeric composition comprises a blend of two or more elastomers. Blends of elastomers may be reactor blends and/or melt mixes. The individual elastomer components may be present in various conventional amounts, with the total elastomer content in the elastomeric composition being expressed as 100 phr in the formulation.

Useful elastomers include isobutylene-based homopolymers or copolymers. An isobutylene based elastomer refers to an elastomer or polymer comprising at least 70 mol % repeat units from isobutylene. These polymers can be described as random copolymers of a $C_4$ to $C_7$ isomonoolefin derived unit, such as an isobutylene derived unit, and at least one other polymerizable unit. The isobutylene-based elastomer may or may not be halogenated.

The elastomer may also be a butyl-type rubber or branched butyl-type rubber, including halogenated versions of these elastomers. Useful elastomers are unsaturated butyl rubbers such as homopolymers and copolymers of olefins, isoolefins, and multiolefins. These and other types of useful butyl rubbers are well known and are described in RUBBER TECHNOLOGY, p. 209-581 (Morton, ed., Chapman & Hall 1995), THE VANDERBILT RUBBER HANDBOOK, p. 105-122 (Ohm ed., R.T. Vanderbilt Col., Inc. 1990), and Kresge and Wang in 8 KIRK-OTHMER ENCYCLOPEDIA OF CHEMICAL TECHNOLOGY, p. 934 to 955 (John Wiley & Sons, Inc. 4th ed. 1993), each of which are incorporated herein by reference. Non-limiting examples of other useful unsaturated elastomers are poly(isobutylene-co-isoprene), polyisoprene, polybutadiene, polyisobutylene, poly(styrene-co-butadiene), natural rubber, star-branched butyl rubber, and mixtures thereof.

In an embodiment, the elastomer may be rubber of types conventionally used in tire rubber compounding for tire components that require characteristics such as high strength and good abrasion along with low hysteresis and high resilience. These elastomers may require antidegradants in the mixed compound if they have poor resistance to both heat and ozone. Examples of such rubbers include natural rubbers ("NR"), polyisoprene rubber ("IR"), poly(styrene-co-butadiene) rubber ("SBR"), polybutadiene rubber ("BR"), poly(isoprene-co-butadiene) rubber ("IBR"), styrene-isoprene-butadiene rubber ("SIBR"), and mixtures thereof.

The elastomeric composition may also comprise rubbers of ethylene and propylene derived units such as ethylene-propylene rubber ("EP") and ethylene-propylene-diene rubber ("EPDM"), and their mixtures. EP and EPDM are may also be considered to be general purpose elastomers. Examples of suitable termonomers in making EPDM are ethylidene norbornene, 1,4-hexadiene, dicyclopentadiene, as well as others.

In one embodiment, the elastomer may include a polybutadiene (BR) rubber. The Mooney viscosity of the polybutadiene rubber as measured at 100° C. (ML 1+4, ASTM D1646) may range from 35 to 70, or from 40 to about 65, or, in another embodiment, from 45 to 60.

Another useful synthetic rubber is high cis-polybutadiene ("cis-BR"). By "cis-polybutadiene" or "high cis-polybutadiene", it is meant that 1,4-cis polybutadiene is used, wherein the amount of the cis component is at least 95%.

The elastomeric composition may also comprise a polyisoprene (IR) rubber. The Mooney viscosity of the polyisoprene rubber as measured at 100° C. (ML 1+4, ASTM D1646) may range from 35 to 70, or from 40 to about 65, or in another embodiment, from 45 to 60.

In another embodiment, the elastomer may also comprise a natural rubber. Natural rubbers are described in detail by Subramaniam in RUBBER TECHNOLOGY, p. 179-208 (Morton, ed., Chapman & Hall, 1995), herein incorporated by reference. Desirable embodiments of the natural rubbers may be selected from technically specified rubbers ("TSR"), such as Malaysian rubbers which include, but are not limited to, SMR CV, SMR 5, SMR 10, SMR 20, SMR 50, and mixtures thereof. Preferred natural rubbers have a Mooney viscosity at 100° C. (ML 1+4, ASTM D1646) of from 30 to 120, or more preferably from 40 to 80.

In another embodiment, the elastomer may comprise a styrene rubber such as styrene butadiene rubber ("SBR") such as emulsion-SBR ("E-SBR"), solution SBR (S-SBR), high styrene rubber ("HSR"), and the like. Desirable embodiments of the SBRs may have a styrene content from 10 wt % to 60 wt %, such as E-SBR elastomers available from JSR Corporation, which include JSR 1500 (25 wt % styrene), JSR 1502 (25 wt % styrene), JSR 1503 (25 wt % styrene), JSR 1507 (25 wt % styrene), JSR 0202 (45 wt % styrene), JSR SL552 (25 wt % styrene), JSR SL574 (15 wt % styrene), JSR SL563 (20 wt % styrene), JSR 0051, JSR 0061, or the like. Preferred SBRs have a Mooney viscosity at 100° C. (ML 1+4, ASTM D1646) of from 30 to 120, or more preferably from 40 to 80.

Other useful elastomers, including functionalized elastomers, are described in U.S. Pat. No. 7,294,644, which is hereby incorporated herein by reference in its entirety for all jurisdicitions where permitted. The elastomers useful in the invention can be blended with various other rubbers or plastics, in particular thermoplastic resins such as nylons or polyolefins such as polypropylene or copolymers of polypropylene. These compositions are useful in air barriers such as bladders, tire inner tubes, tire innerliners, air sleeves (such as in air shocks), diaphragms, as well as other applications where high air or oxygen retention is desirable.

Silane-Functionalized Hydrocarbon Polymer Modifiers ("Si-HPM")

The elastomeric composition further comprises a hydrocarbon polymer modifier ("HPM"), including a silane-functionalized HPM ("Si-HPM"). HPMs useful in this invention include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the HPM is hydrogenated. In other embodiments, the HPM is non-polar. As used herein, non-polar means that the HPM is substantially free of monomers having polar groups.

As used herein, reference to monomers in the HPM and/or Si-HPM interpolymer is understood to refer to the as-polymerized and/or as-derivatized units derived from that monomer. The terms polymer and interpolymer are used broadly herein and in the claims to encompass higher oligomers having a number average molecular weight (Mn) equal to or greater than 500, as well as compounds that meet the molecular weight requirements for polymers according to classic ASTM definitions.

HPMs and/or Si-HPMs can be used as elastomer compounding materials. Depending on how the HPM and/or Si-HPM is compounded, optimization of rubber characteristics for rubber and tire durability, traction, and abrasion resistance can be achieved. The macrostructure (molecular weight, molecular weight distribution, and branching) of the HPM and/or Si-HPM provides unique properties to the polymer additive.

Suitable HPMs may include both aromatic and nonaromatic components. Differences in the HPMs are largely due to the olefins in the feedstock from which the hydrocarbon components are derived. The HPM may contain "aliphatic" hydrocarbon components which have a hydrocarbon chain formed from $C_4$-$C_6$ fractions containing variable quantities of piperylene, isoprene, mono-olefins, and non-polymerizable paraffinic compounds.

Such HPMs are based on pentene, butene, isoprene, piperylene, and contain reduced quantities of cyclopentadiene or dicyclopentadiene.

The HPM may also contain "aromatic" hydrocarbon structures having polymeric chains which are formed of aromatic units, such as styrene, xylene, a-methylstyrene, vinyl toluene, and indene. In one embodiment, the HPM may contain an aromatic content to match the aromatic content of the elastomer component(s), e.g., a high aromatic content in styrene rubbers, or a low aromatic content in natural rubbers, for compatibility or miscibility. Compatibility is desired, for example, where the HPM is used to change or shift the Tg of the elastomer domain, where improved dispersion of the HPM is desired, and/or where compatibility facilitates inhibition of HPM migration in the elastomeric composition. Compatibility may also be desired where the HPM, Si-HPM or Si-HPM derivative is otherwise immiscible with the elastomer component(s) for another reason, such as, for example, a high molecular weight Si-HPM, coupling of the Si-HPM to the filler, or the presence of HPM-derived units such as an HPM-elastomer-co-graft which limits the mobility of the bound HPM and/or facilitates dispersion of the coupled filler particles.

In another embodiment, the HPM may contain an aromatic content to impart incompatibility or immiscibility with the elastomer component(s), e.g., a low aromatic content in styrene rubbers, or a high aromatic content in natural rubbers. Incompatibility may be beneficial where, for example, the HPM is not required or desired to shift or change the Tg of the elastomer phase, especially where the mobility of the HPM may be inhibited by high molecular weight, coupling to the filler(s), co-curing with the elastomer component(s), or any combination thereof.

In accordance with the present invention, the Si-HPM used in rubber compounding includes olefins such as one or more of piperylene, isoprene, amylenes, and cyclic components. The Si-HPM may also contain aromatic olefins such as styrenic components and indenic components.

The functionalized hydrocarbon polymer modifier in embodiments is preferably made from a monomer mixture comprising from 1 to 60% piperylene components, from 5 to 50% cyclic components, and from 1 to 60% aromatic, preferably styrenic components. Alternatively or additionally, in an embodiment, the Si-HPM comprises an interpolymer of from 10 to 80 wt % units derived from at least one piperylene component, from 15 to 50 wt % units derived from at least one cyclic pentadiene component, and from 10 to 30 wt % units derived from at least one styrenic component. The monomer mixture or the interpolymer may optionally comprise up to 5% isoprene, up to 10% amylene components, up to 5% indenic components, or any combination thereof.

Piperylene components are generally a distillate cut or synthetic mixture of $C_5$ diolefins, which include, but are not limited to, cis-1,3-pentadiene, trans-1,3-pentadiene, and mixed 1,3-pentadiene. For example, the piperylene component in one embodiment can include trans-pentadiene-1,3, cyclopentene, cis-pentadiene, and mixtures thereof. In general, piperylene components do not include branched $C_5$ diolefins such as isoprene. In one embodiment, the Si-HPM is prepared from a monomer mix having from 0.1 to 90% piperylene components, or with a range of piperylene components from any lower limit selected from 0.1, 1, 10, 20, 25, 30, 35, 40, 45, or 50% piperylene components up to any higher upper limit selected from 80, 75, 70, 65, 60, 55, 50, 45, 40, or 35% piperylene components, by weight of the total monomers in the monomer mixture. In a particularly preferred embodiment, the HPM is prepared from a monomer mix comprising from 40 to 80% piperylene components, or from 40 to 65% piperylene components, or from 40 to 50% piperylene components.

In one embodiment, the Si-HPM is substantially free of isoprene. In another embodiment, the Si-HPM is prepared from a monomer mix that contains up to 15% isoprene, or less than 10% isoprene, by weight of the monomers in the mix. In yet another embodiment, the monomer mix contains less than 5% isoprene by weight of the monomers in the mix.

In general, the amylene component acts as a chain transfer agent to inhibit molecular weight growth. In an embodiment, the amylene component is selected from the group consisting of 2-methylbutene-1, 2-methylbutene-2, pentene-1, cis-pentene-2, trans-pentene-2 and mixtures thereof. In one embodiment, the Si-HPM is substantially free of amylene derived units. In another embodiment, the Si-HPM monomer mix contains up to 40% amylene, or less than 30% amylene, or less than 25% amylene, or less than 20% amylene or less than 15% amylene or less than 10% amylene or less than 5% amylene, by weight of the monomers in the monomer mix. In yet another embodiment, the Si-HPM is prepared from a monomer mix of from 0.1 up to 10% amylene, by weight of the monomers in the mixture.

Cyclic components are generally a distillate cut or synthetic mixture of $C_5$ and $C_6$ cyclic olefins, diolefins, and dimers, codimers and trimers, etc. from a distillate cut. Cyclics include, but are not limited to, cyclopentene, cyclopentadiene, dicyclopentadiene, cyclohexene, 1,3-cycylohexadiene, and 1,4-cyclohexadiene. A preferred cyclic is cyclopentadiene. The dicyclopentadiene may be in either the endo or exo form. The cyclics may or may not be substituted. Preferred substituted cyclics include cyclopentadienes and dicyclopentadienes substituted with a $C_1$ to $C_{40}$ linear, branched, or cyclic alkyl group, preferably one or more methyl groups. In one embodiment, the cyclic components are selected from the group consisting of: cyclopentadiene, cyclopentadiene dimer, cyclopentadiene trimer, cyclopentadiene-$C_5$ codimer, cyclopentadiene-piperylene codimer, cyclopentadiene-$C_4$ codimer, cyclopentadiene-methyl cyclopentadiene codimer, methyl cyclopentadiene, methyl cyclopentadiene dimer, and mixtures thereof.

In general, the cyclic components increase the softening point. On the other hand, aromatics such as styrene tend to reduce the softening point, but the softening point decrease can be offset by increasing the relative proportion of cyclic component(s). In one embodiment, the Si-HPM may be prepared from a monomer mix that can include up to 60% cyclics or up to 50% cyclics, by weight of the monomers in the mix. Typical lower limits include at least about 0.1% or at least about 0.5% or from about 1.0% cyclics in the monomer mix. In at least one embodiment, the Si-HPM monomer mix may include more than 10% cyclic components up to 20% cyclics or more, or preferably up to 30% cyclics or more, or more preferably up to 40% cyclics or more, or more preferably up to 45% or 50% cyclics or more, by weight of the monomers in the monomer mixture from which the Si-HPM is prepared. In a particularly preferred embodiment, the Si-HPM monomer mixture comprises from about 10 to about 50% cyclics, or from about 20% to about 45% cyclics, or from about 20% to about 40% cyclic components.

Preferred aromatics that may be in the Si-HPM include one or more of styrene, indene, derivatives of styrene, and derivatives of indene. Particularly preferred aromatic olefins include styrene, alpha-methylstyrene, beta-methylstyrene, indene, and methylindenes, and vinyl toluenes. In general, styrenic components do not include fused-rings, such as indenics. Styrenic components include styrene, derivatives of styrene, and substituted sytrenes. In one embodiment, the aromatic component is a styrenic component that is selected from the group consisting of styrene, ortho-methyl-styrene, meta-methyl-styrene, para-methyl-styrene, α-methyl-styrene, t-beta-methyl-styrene, indene, methyl indene, vinyl toluene, and mixtures thereof. The aromatic or styrenic olefins in an embodiment are present in the Si-HPM up to 60% styrenic components or up to 50%, typically from 5% to 45%, or more preferably from 5% to 30%. In particularly preferred embodiments, the Si-HPM comprises from 10% to 25% aromatic or especially styrenic olefins.

The Si-HPM may comprise less than 15% indenic components, or less than 10% indenic components. Indenic components include indene and derivatives of indene. In one embodiment, the Si-HPM comprises less than 5% indenic components. In another embodiment, the Si-HPM is substantially free of indenic components.

In one embodiment, the Si-HPM can have a weight ratio of units derived from aromatic components to units derived from cyclic components, or preferably of styrenic components to cyclic components, of from 1:2 to 3:1, preferably from 1:2 to 2.5:1, or more preferably from 0.8:1 to 2.2:1, or from about 1:1 to about 2:1.

In another embodiment, the Si-HPM can comprise from at least 1 mole percent aromatic hydrogen, based on the total moles of hydrogen in the interpolymer as determined by proton nuclear magnetic resonance (H-NMR). In another embodiment the Si-HPM comprises at least 5 mol % aromatic hydrogen, e.g., from 5 mol % to 30 mol % aromatic hydrogen, or preferably from 5 mol % to 25 mol % aromatic hydrogen, or more preferably from 5 mol % to 20 mol % aromatic hydrogen, or more preferably from 8 mol % to 15 mol % aromatic hydrogen. In another embodiment, the Si-HPM comprises from 1 mol % to 20 mol % aromatic hydrogen, or preferably from 2 mol % to 15 mol % aromatic hydrogen, or more preferably from 2 mol % to 10 mol % aromatic hydrogen.

In one embodiment, there is only one interpolymer in the hydrocarbon polymer modifier. In another embodiment, two or more interpolymers may be blended. When two or more interpolymers are used, either at least one of the interpolymers, or the resulting blended hydrocarbon polymer modifier, preferably both, may preferably comprise from 10 wt % to 80 wt % units derived from at least one piperylene component, from 15 wt % to 50 wt % units derived from at least one cyclic pentadiene component, and from 10 wt % to 30 wt % units derived from at least one aromatic, preferably styrenic components. The hydrocarbon polymer modifier blend may optionally comprise up to 5% isoprene, up to 10% amylene, and up to 5% indenic components. Preferably, the elastomeric composition comprises from 5 to 50 phr of hydrocarbon polymer modifier or hydrocarbon polymer modifier blend.

In another embodiment, the hydrocarbon polymer modifier is an interpolymer of (i) a piperylene component; (ii) an aromatic component; and (iii) a cyclic pentadiene component. The cyclic pentadiene component comprises a dicyclopentadiene fraction (DCPD fraction) and a dimethylcyclopentadiene fraction (MCPD fraction), wherein the DCPD fraction consists of any cyclopentadiene dimers and/or cyclopentadiene codimers other than CPD-MCPD, and wherein the MCPD fraction consists of any methylcyclopentadiene dimers and/or methylcyclopentadiene codimers, including any CPD-MCPD codimers. Methylcyclopentadiene codimers include codimers of methylcyclopentadiene with cyclopentadiene, piperylene, butadiene, and so on. Cyclopentadiene codimers include codimers of cyclopentadiene with piperylene, butadiene, and so on. In an embodiment, the DCPD fraction comprises at least 50 wt % of dicyclopentadiene and less than 50 wt % CPD codimers. A weight ratio of the MCPD fraction to the DCPD fraction is preferably from 0.8 to 20, more preferably 1 to 10, and the MCPD fraction is at least 20 wt % of the cyclic pentadiene component. When the proportion of the MCPD fraction exceeds about 0.8 or 1.0 times the proportion of the DCPD fraction in the cyclic component, the interpolymer can unexpectedly have a balance of softening point, molecular weights, molecular weight distribution and aromaticity, for example, a softening point from 40° C. to 160° C., Mn greater than 400, Mw/Mn from 1.5 to 4, Mz less than 15,000, and at least 8 mol % aromatic hydrogen, based on the total moles of hydrogen in the interpolymer, or preferably, a softening point of at least 80° C., Mn greater than 800, Mw/Mn less than 3, Mz less than 12,000 and/or at least 10 mol % aromatic hydrogen. Mn is herein defined as the number-average molecular weight, Mw is herein defined as the weight-average molecular weight, and Mz herein defined as the z-average molecular weight.

The hydrocarbon polymer modifier in embodiments is preferably made from a monomer mixture comprising from 15% to 70% piperylene components, from 5% to 70% cyclic components, and from 10% to 30% aromatic, preferably styrenic components. Alternatively or additionally, in an embodiment, the hydrocarbon polymer modifier comprises an interpolymer of from 30% to 60% units derived from at least one piperylene component, from 10% to 50% units derived from at least one cyclic pentadiene component, and from 10% to 25% units derived from at least one styrenic component. The monomer mixture or the interpolymer may optionally comprise up to 5% isoprene, up to 10% amylene components, up to 5% indenic components, or any combination thereof.

Generally, HPMs in one embodiment have a number average molecular weight (Mn) greater than about 600 g/mole, or greater than about 800 g/mole, or greater than about 900, or greater than about 1000 g/mole. In an embodiment, the HPM has a Mn between about 900 and 3000 g/mole, or between about 1000 and 1500 g/mole. In at least one embodiment, HPMs have a weight average molecular weight (Mw) greater than about 2500 g/mole, or greater than about 5000 g/mole, or from about 2500 to about 25,000 g/mole, or from 3000 to 20,000 g/mole. Preferably, HPMs have a weight average molecular weight of from 3500 to 15,000 g/mole, or more preferably from about 5000 to about 10,000 g/mole. The HPM may have a z-average molecular weight (Mz) greater than about 10,000 g/mole, or greater than about 20,000 g/mole, or greater than about 30,000 g/mole. In other embodiments, Mz ranges from 10,000 to 150,000 g/mole, or from 20,000 to 100,000 g/mole, or from 25,000 to 75,000 g/mole, or from 30,000 to 60,000 g/mole. Mw, Mn, and Mz may be determined by gel permeation chromatography (GPC).

In one embodiment, the Si-HPM has a polydispersion index ("PDI", PDI=Mw/Mn) of 4 or less. In a particularly preferred embodiment, the HPM has a PDI of at least about 2.5, or at least about 3, or at least about 4, or at least about 5. In other embodiments, Mz/Mn is greater than 5, greater than 10, greater than 12, greater than 15, greater than 20, greater than 25, or greater than 30. In other embodiments, Mz/Mn ranges up to 150 or more, up to 100, up to 80, or up to 60. In other embodiments, Mz/Mn is from 5 to 100, or from 10 to 80, or from 10 to 60, or from 10 to 40, or from 10 to 30, or from 15 to 40, or from 30 to 60 or from 35 to 60.

In an embodiment, the HPM can have a softening point of 80° C. to 160° C., or preferably 100° C. to 160° C., or more preferably from 110° C. to 150° C. Softening point can be determined according to the Ring & Ball Method, as measured by ASTM E-28.

In an embodiment, the HPM can have a glass transition temperature (Tg) of from about 30° C. to about 110° C., or from about 50° C. to 110° C., or from about 60° C. to 100° C. Differential scanning calorimetry (DSC) may be used to determine the Tg of the HPM.

The resins described above may be produced by methods generally known in the art for the production of HPMs, and the invention is not limited by the method of forming the Si-HPM. Preferably, the Si-HPM is produced by combining the olefin feed stream in a polymerization reactor with a Friedel-Crafts or Lewis Acid catalyst at a temperature between 0° C. and 200° C. Friedel-Crafts polymerization is generally accomplished by use of known catalysts in a polymerization solvent, and the solvent and catalyst may be removed by washing and distillation. The polymerization process utilized for this invention may be batchwise or continuous mode. Continuous polymerization may be accomplished in a single stage or in multiple stages.

In an embodiment, the Si-HPM comprises a functional group comprising at least a silane structure, and may optionally comprise one or more additional functional groups such as olefinic unsaturation, benzylic halogen, or the like, by which the Si-HPM can be coupled to the filler, the elastomer or otherwise anchored in the elastomeric matrix. As used herein, reference to functional groups in the Si-HPM interpolymer is understood to refer to the derivatized or as-coupled units derived from that functional group, e.g., one functional group derived from another or the derived form resulting from coupling directly or indirectly to the filler, e.g., via a bifunctional crosslinking agent, or to the elastomer, e.g., via co-curing at olefinic unsaturation sites. In a particular embodiment, the Si-HPM comprises olefinic unsaturation, e.g., at least 1 mol % olefinic hydrogen, based on the total moles of hydrogen in the interpolymer as determined by H-NMR. Olefinic unsaturation generally results from the interpolymerization of diolefinic monomers such as piperylenes, dicyclopentadienes, etc. Olefinic unsaturation is beneficial to facilitate crosslinking with the elastomer component(s), functionalization for co-curing with the filler, for example, or combinations thereof, or the like.

In one embodiment, the HPM and Si-HPM are not hydrogenated (to retain the olefin unsaturation, especially terminal vinyl groups). In another embodiment, the HPM and/or Si-HPM may be partially hydrogenated (especially to remove terminal vinyl groups, where desired). The hydrogenation of the HPM and/or Si-HPM may be carried out by any method known in the art, and the invention is not limited by the method of hydrogenation. For example, the hydrogenation of the HPM and/or Si-HPM may be either a batchwise or a continuous process, e.g., catalytically hydrogenated. Catalysts employed for the hydrogenation of HPMs are typically supported monometallic and bimetallic catalyst systems based on elements from Group 6, 8, 9, 10, or 11 of the Periodic Table of Elements.

In one embodiment, the HPM and/or Si-HPM are at least partially hydrogenated or may be substantially hydrogenated. As used herein, at least partially hydrogenated means that the material contains less than 90% olefinic protons, more preferably less than 75% olefinic protons, more preferably less than 50% olefinic protons, more preferably less than 40% olefinic protons, more preferably less than 25% olefinic protons, more preferably less than 15% olefinic protons, more preferably less than 10% olefinic protons, more preferably less than 9% olefinic protons, more preferably less than 8% olefinic protons, more preferably less than 7% olefinic protons, and more preferably less than 6% olefinic protons. As used herein, substantially hydrogenated means that the material contains less than 5% olefinic protons, more preferably less than 4% olefinic protons, more preferably less than 3% olefinic protons, more preferably less than 2% olefinic protons, more preferably less than 1% olefinic protons, more preferably less than 0.5% olefinic protons, more preferably less than 0.1% olefinic protons, and more preferably less than 0.05% olefinic protons after hydrogenation (and before reaction with the graft monomer).

The degree of hydrogenation, when employed, is typically conducted so as to minimize and preferably avoid hydrogenation of the aromatic bonds. In embodiments wherein the HPM and/or Si-HPM are substantially hydrogenated, it is believed that the graft monomer is appended to the resin/oligomer backbone as opposed to forming a copolymer (of resin/oligomers and graft monomers) because of the lack of terminal olefinic bonds on the substantially hydrogenated HPM and/or Si-HPM (as indicated by the preferred low olefinic proton measurements).

In other embodiments, where the HPM and/or Si-HPM are not hydrogenated or only partially hydrogenated, the presence of terminal olefinic bonds facilitates terminal sylilation, terminal organosilane coupling agent functionalization and/or terminal crosslinking, which may improve HPM-elastomer compatibilization and better retention of properties modified by the hydrocarbon polymer modifier.

In one embodiment, the Si-HPM comprises a silane structure as the functional group, e.g., a pendant —$SiX_3$ group where X is independently a silicon functional group such as hydroxy, alkoxy, alkoxyalkoxy, aryloxy, aralkoxy or cycloalkoxy group of up to 20 carbon atoms. The silicon functional group X can further optionally be substituted with or coupled to a silicate, e.g., at the surface of a silica filler particle. The silane structure can be provided by including a silane monomer in the polymer mix of the interpolymerization to obtain the silicon functional Si-HPM directly, by silylating the HPM with an organo-functional silane compound, or by dynamically functionalizing the HPM in the elastomeric composition with a bifunctional organosilane crosslinking agent, or the like.

As examples of silicon functional monomers that can be incorporated in the HPM interpolymerization, there may be mentioned vinyltriethoxysilane, (cyclopentadienylpropyl)triethoxysilane and 1,2-epoxy propoxypropyl)methyldiethoxysilane, either via cationic reaction (all three examples) or Diels-Alder reaction (first two examples).

In one embodiment, one or more silane coupling agents are used to treat the HPM or a functionalized HPM (functionalized with a functional group other than a silicon functional group, e.g., an organofunctional group that is reactive with an organofunctional group of a bifunctional silane coupling agent) to provide silicon functionality, either as a pre-reaction or dynamically in the elastomeric compositions. Such coupling agents are particularly desirable when silica is the primary filler, or is present in combination with another filler, as they help bind the silica to the Si-HPM, and can also help bind the silica to the elastomer. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane, gamma-mercaptopropyltrimethoxysilane, and the like, and mixtures thereof. In various embodiments, depending on the manner in which they are incorporated, sulfide-type, mercapto-type, vinyl-type, amino-type, glycidoxy-type, nitro-type and chloro-type silane coupling agents may be used, alone or in any combination. Examples of silane coupling agents include silane esters, amino silanes, amido silanes, ureido silanes, halo silanes, epoxy silanes, vinyl silanes, methacryloxy silanes, mercapto silanes, and isocyanato silanes.

In one embodiment, the bifunctional organosilane crosslinking agent has the formula:

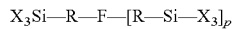

$$X_3Si—R—F—[R—Si—X_3]_p$$

wherein each X is independently a silicon functional group, each R is independently a divalent substituted or unsubstituted hydrocarbon group of from 1 to 20 carbon atoms, preferably up to 10 carbon atoms, and especially from 1 to 5 carbon atoms; F is a monovalent or multivalent organofunctional group; p is 0 when F is monovalent and p is at least 1, e.g., from 1 to 5, when F is multivalent. In an embodiment, X is hydroxy or $R^1$—O— wherein $R^1$ is an alkyl, alkoxyalkyl, aryl, aralkyl or cycloalkyl group of up to 20 carbon atoms, preferably up to 10 carbon atoms, and especially from 1 to 5 carbon atoms, R is alkylene preferably up to 10 carbon atoms, and especially from 1 to 5 carbon atoms, wherein p is 0 or 1; and when p is 0 F is selected from amino, amido, hydroxy, alkoxy, halo, mercapto, carboxy, acyl, vinyl, allyl, styryl, ureido, epoxy, isocyanato, glycidoxy, and acryloxy groups; and when p is 1 F is divalent polysulfide of from 2 to 20 sulfur atoms.

Examples of vinyl-type silane coupling agents are vinyl triethoxysilane and vinyl trimethoxysilane.

Examples of amino-type silane coupling agents are 3-aminopropyltriethoxysilane, 3-aminopropyltrimethoxysilane, 3-(2-aminoethyl)aminopropyltriethoxysilane and 3-(2-aminoethyl) aminopropyltrimethoxysilane.

Examples of glycidoxy-type silane coupling agents are γ-glycidoxypropyltriethoxysilane, γ-glycidoxypropyltrimethoxysilane, γ-glycidoxypropylmethyldiethoxysilane and γ-glycidoxypropylmethyldimethoxysilane.

Examples of nitro-type silane coupling agents are 3-nitropropyltrimethoxysilane and 3-nitropropyltriethoxysilane.

Examples of chloro-type silane coupling agents are 3-chloropropyltrimethoxysilane, 3-chloropropyltriethoxysilane, 2-chloroethyltrimethoxysilane and 2-chloroethyltriethoxysilane.

Specific examples of sulfide-type silane coupling agents are bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl) trisulfide, bis(3-triethoxysilylpropyl)disulfide, bis(3-trimethoxysilylpropyl)disulfide, 3-trimethoxysilylpropyl-N,N-dimethylthio carbamoyltetrasulfide, 3-triethoxysilylpropyl-N,N-dimethylthio carbamoyltetrasulfide, 2-triethoxysilylethyl-N,N-dimethylthio carbamoyltetrasulfide, 2-trimethoxysilylethyl-N,N-dimethylthio carbamoyltetrasulfide, 3-trimethoxysilylpropylbenzothiazolyl tetrasulfide, 3-triethoxysilylpropylbenzothiazole tetrasulfide, 3-triethoxysilylpropylmethacrylate monosulfide and 3-trimethoxysilylpropylmethacrylate monosulfide. In an embodiment, the silane coupling agent may have the general formula $(C_nH_{2n+1}O)_3Si—(CH_2)_m—S_p—(CH_2)_m—Si(C_nH_{2n+1}O)_3$ wherein n represents an integer of 1 to 3, m represents an integer of 1 to 9, p represents an average number of sulfur atoms and a positive number of more than 2.

Examples of mercapto-type silane coupling agents are 3-mercaptopropyltrimethoxysilane, 3-mercaptopropyltriethoxysilane, 2-mercaptoethyltrimethoxysilane and 2-mercaptoethyltriethoxysilane.

These silane coupling agents can be used alone or two or more kinds can be used together.

Preferred examples of silane coupling agents in one embodiment can include: N-(2-aminoethyl)-3-aminopropyltrimethoxysilane, 3-methacryloxypropyltrimethoxysilane, 3-(2-(vinylbenzylamino)ethylamino)-propyltrimethoxysilane, 3-glycidoxypropyltrimethoxysilane, triacetoxyvinylsilane, tris-(2-methoxyethoxy)-vinylsilane, 3-chloropropyltrimethoxysilane, 1-trimethoxysilyl-2-(p,m-chloromethyl) phenylethane, 3-chloropropyltriethoxysilane, N-(aminoethylaminomethyl)phenyltrimethoxysilane, N-(2-aminoethyl)-3-aminopropyl tris(2-ethylhexoxy)silane, 3-aminopropyltrimethoxysilane, trimethoxysilylpropylenetriamine, β(3,4-epoxycyclohexypethyltrimethoxysilane, 3-mercaptopropyltrimethoxysilane, 3-mercaptotriethoxysilane, 3-mercaptopropylmethyldimethoxysilane, bis(2-hydroxyethyl)-3-aminopropyltrimethoxysilane, 1,3-divinyltetramethyldisilazane, vinyltrimethoxysilane, 2-(diphenylphosphino)ethyltriethoxysilane, 2-methacryloxyethyldimethyl[3-trimethoxysilylpropyl]ammonium chloride, 3-isocyanatopropyldimethylethoxysilane, N-(3-acryloxy-2-hydroxypropyl)-3-aminopropyltriethoxysilane, vinyl tris(t-butylperoxy)silane, methyltrimethoxysilane, ethyltrimethoxysilane, phenyltrimethoxysilane, phenyltriacetoxysilane, methyltrimethoxysilane, phenyltrimethoxysilane.

The more preferred silane coupling agents are those which are commercially available and which are recognized by those skilled in the art as being effective coupling agents. A number of organofunctional silanes are available, for example, from Union Carbide, Specialty Chemicals Division, Danbury, Conn. Examples of useful silane coupling agents available from Union Carbide are disclosed in EP 0 926 265 A1, which is hereby incorporated herein by reference.

In one embodiment, the silane coupling agent is a ureido silane represented by the formula $B_{(4-n)}—Si-(A-N(H)—C(O)—NH_2)_n$ wherein A is an alkylene group containing from 1 to about 8 carbon atoms, B is a hydroxy or alkoxy group containing from 1 to about 8 carbon atoms and n is an integer from 1 to 3 provided that if n is 1 or 2, each B may be the same or different. In one embodiment, each B is an alkoxy group containing 1 to about 5 carbon atoms, particularly methyloxy or ethyloxy groups, and A is a divalent hydrocarbon group containing from 1 to 5 carbon atoms. Examples of such divalent hydrocarbon groups include methylene, ethylene, propylene, butylene, etc. Specific examples of such ureido silanes include β-ureidoethyl-trimethoxysilane; β-ureidoethyl-triethoxysilane; γ-ureidoethyl-trimethoxysilane; γ-ureidopropyl-triethoxysilane, etc.

In one embodiment, an HPM with or without olefinic unsaturation, e.g., piperylene, C5/C9, dicyclopentadiene limonene and pinene based interpolymers, is treated with the bifunctional organosilane crosslinking agent and a peroxide initiator. The peroxide initiator forms a free radical on the HPM which reacts with the organofunctional groups of the crosslinking agent, e.g., vinyl or sulfhydryl. The resulting SI-HPM has pendant silane structures which can react with the filler to couple the SI-HPM resin to the filler and should have only limited reactivity with the elastomer during curing:

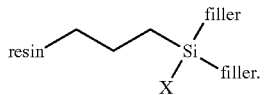

As an alternative option, hydrosilylation can be used to react with a functional group of the HPM, e.g., a terminal vinyl group, to add a reactive silane group, amine group, alkylamine group or the like:

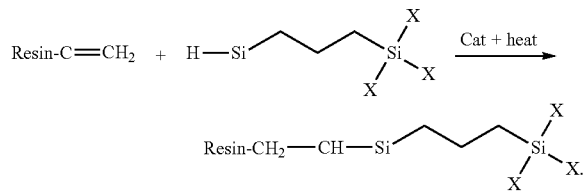

In another embodiment, the HPM with olefinic unsaturation can be dynamically coupled to silica filler during the vulcanization of the elastomer with sulfur, for example. During curing the sulfur linkages in sulfide-type silane coupling agents generally cleave to graft onto the olefinic unsaturation in the HPM (as well as the elastomer), thereby coupling the silica filler to the Si-HPM, in one or multiple crosslinks, depending on the degree of functionalization:

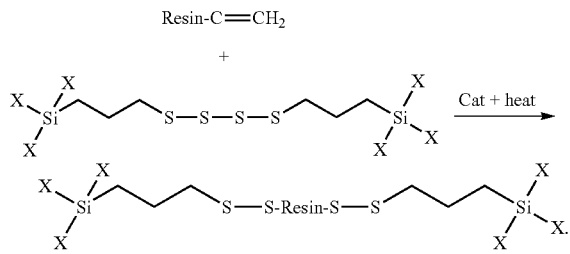

This cure system stabilizes the Si-HPM by coupling to the filler, and also by co-curing with the elastomer where there is excess reactive olefinic unsaturation in the Si-HPM, and further by increasing shear during mixing of the elastomeric composition, thereby increasing viscosity of the system via the filler-coupled Si-HPM.

In an embodiment, the Si-HPM further comprises one or more organofunctional groups in addition to the silane functionality by which the Si-HPM can be crosslinked to itself, coupled to the filler or the elastomer, or otherwise anchored in the elastomeric matrix. These Si-HPM are capable of creating and participating in cross-linking within the composition medium by cross-linking with the other components of the adhesive formulation. In one example, residual olefinic unsaturation in the Si-HPM can participate in the curing reaction, or can react with the organofunctionality in a crosslinking or coupling agent, e.g., a bifunctional organosilane coupling agent. In another example, anhydride or acid groups in the Si-HPM can cross-link with themselves or with other polymers present in the composition medium.

As previously mentioned, the elastomeric composition can include, in addition to the Si-HPM, a non-functionalized HPM or an HPM functionalized with a functional group(s) other than silane functional groups (FHPM), such as, for example, the grafted resins, grafted oligomers and/or blends thereof described in the aforementioned U.S. Pat. No. 7,294,664, incorporated by reference above. The Si-HPM/FHPM/HPM blends may be obtained by blending separate FHPM and/or HPM components with the Si-HPM, by partially functionalizing the HPM, and/or by partially silane-functionalizing the FHPM or HPM.

Some polymers containing amine or alcoholic functionality will react directly with the FHPM and/or Si-HPM, e.g., those polymers containing some vinyl alcohol groups will react with carboxylic acid-functionalized FHPM or Si-HPM. Other polymers will cross-link when a cross-linking agent is added. In these embodiments, the amount of cross-linking agent added is typically dependent on the amount of graft monomer present. Typical amounts include between 100:1 and 1:100, more preferably 1:1 parts cross linking agent per parts graft monomer (molar ratio) present in the formulation. These include polymers containing some acrylic acid such as ethylene alkyl-acrylate acrylic acid terpolymers or polymers containing succinic anhydride or acid groups such as maleic anhydride grafted ethylene propylene diene rubbers. Such cross-linking can be achieved in many ways, including the addition of difunctional agents capable of reacting with the acid or anhydride groups. Examples of such materials are those containing alcohol and amine functionality such as diols, diamines, especially primary amines. The material having these functional groups may be mixed or have different substitutions, for example a diamine where one group is primary and the other is tertiary. Weaker cross-linking can be achieved via interactions which do not form covalent bonds such as ionic and hydrogen bonds. Examples of materials capable of cross-linking in such a manner are divalent metal ions such as Ca<++> or diamines containing quaternary amines. In an embodiment, crosslinking agents include alcohols, polyols, amines, diamines and/or triamines. Examples of organofunctional crosslinking agents in one embodiment include polyamines such as ethylenediamine, diethylenetriamine, hexamethylenediamine, diethylaniinopropylamine, and/or menthanediamine.

Fillers and Additives

The elastomeric compositions produced in accordance with the present invention typically contain other components and additives customarily used in rubber compounds, such as effective amounts of other processing aids, pigments, accelerators, cross-linking and curing materials, antioxidants, antiozonants, fillers, and/or clays. In addition to HPM the elastomeric compositions may optionally include other useful processing aids such as, for example, plastomers, polybutene, or mixtures thereof.

In addition to comprising at least one elastomer and at least one hydrocarbon polymer modifier, the elastomeric compositions may also optionally comprise at least one filler, for example, calcium carbonate, clay, mica, silica, silicates, talc, titanium dioxide, aluminum oxide, zinc oxide, starch, wood flour, carbon black, or mixtures thereof. The fillers may be any size and typically range, for example, in the tire industry, from about 0.0001 μm to about 100 μm.

As used herein, silica is meant to refer to any type or particle size silica or another silicic acid derivative, or silicic acid, processed by solution, pyrogenic, or like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

The elastomeric composition may also include clay. The clay may be, for example, montmorillonite, nontronite, beidellite, vokoskoite, laponite, hectorite, saponite, sauconite, magadite, kenyaite, stevensite, vermiculite, halloysite, aluminate oxides, hydrotalcite, or mixtures thereof, optionally, treated with modifying agents. The clay may contain at least one silicate. Alternatively, the filler may be a layered clay, optionally, treated or pre-treated with a modifying agent such as organic molecules; the layered clay may comprise at least one silicate.

The silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which include saponite, hectorite, and sauconite. Also encompassed are synthetically prepared smectite-clays.

The silicate may comprise natural or synthetic phyllosilicates, such as montmorillonite, nontronite, beidellite, bentonite, volkonskoite, laponite, hectorite, saponite, sauconite, magadite, kenyaite, stevensite, and the like, as well as vermiculite, halloysite, aluminum oxides, hydrotalcite, and the like. Micas such as kaolinite, sericite, phlogopite and muscovite may also be mentioned. Combinations of any of the above discussed silicates are also contemplated.

The layered filler such as the layered clays described above may be modified such as intercalated or exfoliated by treatment with at least one modifying agent. Modifying agents are also known as swelling or exfoliating agents. Generally, they are additives capable of undergoing ion exchange reactions with the cations present at the interlayer surfaces of the layered filler. The modifying agent may be added as an additive to the composition at any stage; for example, the additive may be added to the elastomer, followed by addition of the layered filler, or may be added to a combination of at least one elastomer and at least one layered filler; or the additive may be first blended with the layered filler, followed by addition of the elastomer in yet another embodiment.

The filler may be carbon black or modified carbon black. The filler may also be a blend of carbon black and silica. In one embodiment, the elastomeric composition is a tire tread or sidewall and comprises reinforcing grade carbon black at a level of from 10 to 100 phr of the blend, more preferably from 30 to 80 phr in another embodiment, and in yet another embodiment from 50 to 80 phr. Useful grades of carbon black include the ranges of from N110 to N990.

Nanocomposites

Nanocomposites are filled polymer systems wherein the filler comprises inorganic particles with at least one dimension in the nanometer range. Common types of inorganic particle used in nanocomposites are phyllosilicates, an inorganic substance from the general class of so called "nanoclays" or "clays." Due to general enhancement in air barrier qualities of various elastomeric compositions when a nanocomposite is present, there is a desire to have an elastomeric composition comprising a nanocomposite comprising elastomer and clay. The hydrocarbon polymer modifiers in an embodiment can be used in nanocomposites to enhance gas barrier properties. For example, the Si-HPM can improve dispersion of the nanoparticles in the elastomer, and the high molecular weight of the Si-HPM can help increase the length of the diffusion path of the gas molecules, etc.

The inorganic particles (e.g., clays) can act as plate-like barriers to the transmission of oxygen through the elastomeric composition. However, in order to be effective the inorganic particles need to be fully dispersed throughout the elastomeric composition. This can be difficult, as it generally requires the dispersion of polar clay in a generally non-polar rubber. Ideally, intercalation should take place in the nanocomposite, wherein the polymer inserts into the space or gallery between the clay surfaces. Ultimately, it is desirable to have near complete exfoliation, wherein the polymer is fully dispersed or intercalated with the individual nanometer-size clay platelets.

Suitable inorganic particles useful in nanocomposites can include swellable inorganic clay materials, such as natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminum oxides, hydrotalcite, and the like. These layered clays generally comprise particles containing a plurality of silicate platelets having a thickness of 0.8-1.2 nm tightly bound together at an interlayer spacing of 0.4 nm or less, and contain exchangeable cations such as $Na^+$, $Ca^{+2}$, $K^+$, or $Mg^{+2}$ present at the interlayer surfaces.

In some embodiments, the clay can be mixed with an organic liquid to form a clay dispersion. The clay can be inorganic clay or an organically modified clay; the organic liquid can be miscible or immiscible in water. In certain embodiments, the dispersion can have a clay concentration in the range of 0.1 wt % to 5.0 wt %, or in the range of 0.1 wt % to 3.0 wt %.

The layered clay may also be intercalated and exfoliated by treatment with organic molecules, typically known as swelling or exfoliating agents or additives. The swelling/exfoliating agents are capable of undergoing ion exchange reactions with the cations present at the interlayer surfaces of the layered clay. For example, an intercalated/exfoliated clay may be produced through solution based ion-exchange reactions that replace sodium ions that exist on the surface of the sodium montmorillonite clay with organic molecules (swelling/exfoliating agents), such as alkyl or aryl ammonium compounds.

Suitable exfoliating agents include cationic surfactants such as ammonium ion, alkylamines or alkylammonium ion (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R_1R_2R_3N$, wherein $R_1$, $R_2$, and $R_3$ are $C_1$ to $C_{30}$ alkyls in one embodiment or $C_2$ to $C_{30}$ alkyls or alkenes in another embodiment, which may be the same or different. In one embodiment, the exfoliating agent is a so called long chain tertiary amine, wherein at least $R_1$ is a $C_{14}$ to $C_{20}$ alkyl or alkene.

The exfoliating agent can also be a diamine compound (or the corresponding ammonium or diammonium ion), such as diaminoalkane, N-alkyl-diaminoalkane, N,N-dialkyl-diaminoalkyl, N,N,N'-trialkyl-diaminoalkane, N,N,N',N'-tetraalkyl-diaminoalkane, or the like. Desirable diamines can have the structure $R_4R_5N$—$R_6$—$NR_7R_8$, wherein $R_4$, $R_5$, $R_6$, $R_7$, and $R_8$ are the same or different $C_1$ to $C_{30}$ alkyls, or $C_2$ to $C_{30}$ alkyls or alkenes. When a long chain diamine is desired, at least one of the N-alkyl or N-alkene groups has from 8 to 30 carbon atoms, preferably from 14 to 20 carbon atoms. Specific non-limiting, illustrative examples include N-coco-1,3-diaminopropane, N-oleyl-1,3-diaminopropane, N-tallow-1,3-diaminopropane, and N,N,N'-trimethyl-N'-tallow-1,3-diaminopropane.

Another class of exfoliating agents includes those which can be covalently bonded to the interlayer surfaces. These include polysilanes of the structure —Si$(R_{15})_2 R_{16}$ where $R_{15}$ is the same or different at each occurrence and is selected from alkyl, alkoxy or oxysilane and $R_{16}$ is an organic radical compatible with the matrix polymer of the composite. Other suitable exfoliating agents include protonated amino acids and salts thereof containing 2-30 carbon atoms such as 12-aminododecanoic acid, epsilon-caprolactam and like materials. Suitable swelling agents and processes for intercalating layered clay silicates are also disclosed in U.S. Pat. Nos. 4,472,538; 4,810,734; and 4,889,885, all of which are incorporated herein by reference.

In a preferred embodiment, the exfoliating agent(s) are capable of reaction with functional sites such as silyl groups, halogens, olefinic unsaturation or the like, on the interpolymer and/or elastomer to form complexes which help exfoliate the clay. In one embodiment, the agent includes all primary, secondary, and tertiary amines and phosphines; alkyl and aryl sulfides and thiols; and their polyfunctional versions. Desirable agents include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

In one embodiment, the exfoliating agent may be present in the range of 0.1 to 20 phr or in the range of 0.2 to 15 phr, or in the range of 0.3 to 10 phr in another embodiment. The exfoliating agent may be added to the composition at any stage; for example, the agent may be added to the elastomer and/or interpolymer, followed by addition of the clay, or may be added to the elastomer and/or interpolymer and clay mixture; or the additive may be first blended with the clay, followed by blending with the elastomer and/or interpolymer in yet another embodiment.

In another embodiment, improved impermeability is achieved by the presence of at least one polyfunctional curative. An embodiment of such polyfunctional curatives can be described by the formula Z—$R_{17}$—Z', wherein $R_{17}$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer (elastomer and/or interpolymer) having reactive groups such as unsaturation. The polyfunctional curative, if present, may be present in the composition in the range of 0.1 to 8 phr or in the range of 0.2 to 5 phr in another embodiment.

The elastomeric composition may also include reversion resistors. Non-limiting examples of such reversion resistors include bis-thiosulfate compounds, such as hexamethylene bis(sodium thiosulfate). Other reversion resistors are well known in the rubber compounding arts, such as hexamethylene bis(cinnamaldehyde).

Treatment with the swelling agents results in intercalation or "exfoliation" of the layered clay platelets as a consequence of a reduction of the ionic forces holding the layers of clay platelets together and introduction of molecules between layers which serve to space the layers at distances of greater than 0.4 nm, preferably greater than 0.9 nm. This separation allows the layered clay silicate to more readily absorb polymerizable monomer material and polymeric material between the layers and facilitates further delamination of the layers when the intercalate is shear mixed with matrix polymer material to provide a uniform dispersion of the exfoliated clay layers within the polymer matrix.

The amount of clay or exfoliated clay incorporated in the elastomeric composition is sufficient to develop an improvement in the mechanical properties or barrier properties of the composition by the formation of a nanocomposite. Amounts of clay in the elastomeric composition generally will be in the range of 0.5 wt % to 10 wt % or in the range of 1 wt % to 8 wt %, or in the range of 1 wt % to 5 wt % in another embodiment, based on the polymer content of the composition. Expressed in parts per hundred parts of rubber, the clay or exfoliated clay may be present in the range of 1 to 30 phr or in the range of 2 to 20 phr.

Elastomer-clay nanocomposites can be formed using a variety of processes known in the art, such as solution blending, melt blending, or an emulsion process. For example, U.S. Patent Application Publication 2007/015853, incorporated herein by reference, discloses a method for preparing clay-butyl rubber nanocomposites from an emulsion of rubber solution and aqueous clay dispersion in which the clay can be an inorganic clay. As another example of nanocomposite processing, U.S. Pat. No. 7,501,460, incorporated herein by reference, discloses a method for preparing clay-butyl rubber nanocomposites by preparing a concentrated nanocomposite from a slipstream of the rubber and blending the concentrate with a main rubber stream.

In one embodiment, the elastomeric composition may contain a nanocomposite formed by a polymer melt blending process. For example, the elastomer and clay components may be blended to form an intercalate in any suitable mixing device such as a BANBURY mixer, BRABENDER mixer, or preferably a mixer/extruder and mixing at temperatures in the range of 120° C. up to 300° C., under conditions of shear sufficient to allow the clay to intercalate and to exfoliate and become uniformly dispersed within the polymer to form the nanocomposite.

In another embodiment, a nanocomposite may be formed by an emulsion process. For example, the emulsions may be formed by conventional emulsion technology, that is, subjecting a mixture of the hydrocarbon, water, and surfactant, when used, to sufficient shearing, as in a commercial blender or its equivalent for a period of time sufficient for forming the emulsion, e.g., generally at least a few seconds. The emulsion can be allowed to remain in emulsion form, with or without continuous or intermittent mixing or agitation, with or without heating or other temperature control, for a period sufficient to enhance exfoliation of the clay, for example, from 0.1 to 100 hours or more in one embodiment, or from 1 to 50 hours, or from 2 to 20 hours in another embodiment.

Useful cationic surfactants include tertiary amines, diamines, polyamines, amine salts, as well as quaternary ammonium compounds. Useful non-ionic surfactants include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates. The surfactant concentration is generally that which will allow the formation of a relatively stable emulsion; in preferred embodiments, the amount of surfactant employed is at least 0.001 wt % of the total emulsion, more preferably in the range of 0.001 wt % to about 3 wt %, and most preferably in the range of 0.01 wt % to 2 wt %.

In other embodiments, the nanocomposite may be formed by solution blending. For example, the nanocomposite may be produced by contacting Solution A comprising a solvent comprising a hydrocarbon and at least one layered filler or clay with Solution B comprising a solvent and at least one elastomer, and removing the solvents from the contact product of Solution A and Solution B to form a nanocomposite. The layered clay may be treated with a swelling/exfoliating agent. In yet another embodiment, a nanocomposite is produced by a process comprising contacting at least one elastomer and at least one layered filler in at least one or more solvents; and removing the solvent(s) from the product to form a nanocomposite. In yet another embodiment, a nanocomposite is produced by a process to form a contact product comprising dispersing at least one layered filler and then dissolving at least one elastomer in a solvent or solvent mixture comprising at least two solvents; and removing the solvent mixture from the contact product to form a nanocomposite.

In solution blending processes, the solvents may be present in the range of 30 wt % to 99 wt %, alternatively 40 wt % to 99 wt %, alternatively 60 wt % to 99 wt %, alternatively 80 wt % to 99 wt %, alternatively in the range of 90 wt % to 99 wt %, alternatively from 95 wt % to 99 wt %, based upon the total weight of the composition.

Crosslinking Agents, Curatives, Cure Packages, and Curing

The elastomeric compositions and the articles made from those compositions are generally manufactured with the aid of at least one cure package, at least one curative, at least one crosslinking agent, and/or undergo a process to cure the elastomeric composition. As used herein, cure package refers to any material or method capable of imparting cured properties to a rubber as is commonly understood in the industry.

One or more crosslinking agents are generally used in the elastomeric compositions of the present invention, especially when silica is the primary filler, or is present in combination with another filler. Crosslinking and curing agents include sulfur, zinc oxide, and fatty acids. More preferably, the curing agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyl-trimethoxysilane, gamma-amino-propyl triethoxysilane (sold commercially as A1100 by Witco), gamma-mercapto-propyltrimethoxysilane (A189 by Witco) and the like, and mixtures thereof. In one embodiment, bis-(3-triethoxysilylpropyl)tetrasulfide (sold commercially as "Si69") is employed.

Generally, polymer blends are crosslinked to improve the mechanical properties of the polymer. Physical properties, performance characteristics, and durability of vulcanized rubber compounds are known to be related to the number (crosslink density) and type of crosslinks formed during the vulcanization reaction. Polymer blends may be crosslinked by adding curative agents, for example sulfur, metals, metal oxides such as zinc oxide, peroxides, organometallic compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The compositions may be vulcanized (cured) by any suitable means, such as subjecting them to heat or radiation according to any conventional vulcanization process. The amount of heat or radiation needed is that which is required to affect a cure in the composition, and the invention is not herein limited by the method and amount of heat required to cure the composition. Typically, the vulcanization is conducted at a temperature ranging from about 100° C. to about 250° C. in one embodiment, from 150° C. to 200° C. in another embodiment, for about 1 to 150 minutes.

Halogen-containing elastomers may be crosslinked by their reaction with metal oxides. Examples of useful metal oxides include, but are not limited to, ZnO, CaO, and PbO. The metal oxide can be used alone or in conjunction with its corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof.

Sulfur is the most common chemical vulcanizing agent for diene-containing elastomers. The sulfur vulcanization system may consist of an activator to activate the sulfur, an accelerator, and a retarder to help control the rate of vulcanization.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset of and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the acceleration accelerant, often an organic compound. The mechanism for accelerated vulcanization of natural rubber, BR, and SBR involves complex interactions between the curative, accelerator, activators, and polymers. Ideally, the entire available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-t-butyl-2-benzothiazole sulfenamide (TBBS), N-cyclohexyl-2-benzothiazole-sulfenamide (CBS), and thioureas.

In one embodiment of the invention, at least one curing agent(s) is present from 0.2 to 10 phr, or from 0.5 to 5 phr, or in another embodiment from 0.75 phr to 2 phr.

Processing

The inventive elastomeric composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage the mixing typically occurs at a temperature, or ultimate temperature, lower than the mix temperature(s) of the preceding non-productive mix stage(s). The elastomers, polymer additives, silica and silica coupler, and carbon black, if used, are generally mixed in one or more non-productive mix stages. The terms "non-productive" and "productive" mix stages are well known to those having skill in the rubber mixing art.

In one embodiment, the filler is added in a different stage from zinc oxide and other cure activators and accelerators. In another embodiment, antioxidants, antiozonants, and processing materials are added in a stage after the carbon black has been processed with the elastomers, and zinc oxide is added at a final stage to maximize the compound modulus. In a further embodiment, mixing with the clays is performed by techniques known to those skilled in the art, wherein the clay is added to the polymer at the same time as the filler. In other embodiments, additional stages may involve incremental additions of one or more fillers.

In another embodiment, mixing of the components may be carried out by combining the elastomer components, filler and clay in any suitable mixing device such as a two-roll open mill, BRABENDER™ internal mixer, BANBURY™ internal mixer with tangential rotors, Krupp internal mixer with intermeshing rotors, or preferably a mixer/extruder, by techniques known in the art. Mixing may be performed at temperatures up to the melting point of the elastomer(s) used in the composition in one embodiment, or from 40° C. to 250° C. in another embodiment, or from 100° C. to 200° C. in yet another embodiment. Mixing should generally be conducted under conditions of shear sufficient to allow the clay to exfoliate and become uniformly dispersed within the elastomer(s).

Typically, from 70% to 100% of the elastomer or elastomers is first mixed for 20 to 90 seconds, or until the temperature reaches from 40° C. to 75° C. Then, approximately 75% of the filler, and the remaining amount of elastomer, if any, are typically added to the mixer, and mixing continues until the temperature reaches from 90° C. to 150° C. Next, the remaining filler is added, as well as the processing aids, and mixing continues until the temperature reaches from 140° C. to 190° C. The masterbatch mixture is then finished by sheeting on an open mill and allowed to cool, for example, to from 60° C. to 100° C. when curatives may be added.

INDUSTRIAL APPLICABILITY

The elastomeric compositions of the invention may be extruded, compression molded, blow molded, injection molded, and laminated into various shaped articles including fibers, films, laminates, layers, industrial parts such as automotive parts, appliance housings, consumer products, packaging, and the like.

In particular, the elastomeric compositions are useful in components for a variety of tire applications such as truck tires, bus tires, automobile tires, motorcycle tires, off-road tires, aircraft tires, and the like. Such tires can be built, shaped, molded, and cured by various methods which are known and will be readily apparent to those having skill in the art. The elastomeric compositions may either be fabricated into a finished article or a component of a finished article such as an innerliner for a tire. The component may be selected any tire component such as air barriers, air membranes, films, layers (microlayers and/or multilayers), innerliners, inner tubes, air sleeves, sidewalls, treads, tire curing bladders, and the like. The elastomeric composition may be particularly useful in a tire tread.

The elastomeric compositions of the present invention are useful in a variety of applications, particularly pneumatic tire components, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and various bladders for fluid retention and curing processes. They are also useful as plasticizers in rubber formulations; as components to compositions that are manufactured into stretch-wrap films; as dispersants for lubricants; and in potting and electrical cable filling and cable housing materials.

The elastomeric compositions may also be useful in molded rubber parts and may find wide applications in automobile suspension bumpers, auto exhaust hangers, and body mounts. In yet other applications, the elastomer(s) or elastomeric compositions of the invention are also useful in medical applications such as pharmaceutical stoppers and closures and coatings for medical devices.

Accordingly, the invention provides the following embodiments:

A. An elastomeric composition comprising at least one elastomer, at least one filler and at least one silane-functionalized hydrocarbon polymer modifier (Si-HPM) wherein the Si-HPM comprises an interpolymer comprising at least one monomer chosen from the group consisting of piperylenes, cyclic pentadienes, aromatics, limonenes, pinenes, and amylenes, and one or more functional groups comprising a silane structure to couple the resin to the filler.

B. The elastomeric composition of embodiment A, wherein the one or more functional groups further comprise olefinic unsaturation to couple the resin to the elastomer, wherein the interpolymer comprises at least 1 mol % olefinic hydrogen, based on the total moles of hydrogen in the interpolymer.

C. The elastomeric composition of embodiment A or embodiment B, wherein the Si-HPM comprises the reaction product of the interpolymer and a bifunctional organosilane crosslinking agent of the formula:

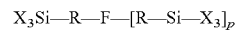

wherein each X is independently a silicon functional group, each R is independently a divalent substituted or unsubstituted hydrocarbon group of from 1 to 20 carbon atoms, F is a monovalent or multivalent organo-functional group, p is 0 when F is monovalent and p is at least 1 when F is multivalent.

D. The elastomeric composition of embodiment C, wherein X is hydroxy or $R^1$—O— wherein $R^1$ is an alkyl, alkoxyalkyl, aryl, aralkyl or cycloalkyl group of up to 20 carbon atoms, R is alkylene, wherein p is 0 or 1, and when p is 0 F is selected from amino, amido, hydroxy, alkoxy, halo, mercapto, hydrosilyl, carboxy, acyl, vinyl, allyl, styryl, ureido, epoxy, isocyanato, glycidoxy, and acryloxy groups, and when p is 1 F is divalent polysulfide of from 2 to 20 sulfur atoms.

E. The elastomeric composition of any one of embodiments A to D, wherein the at least one filler comprises silica.

F. The elastomeric composition of any one of embodiments A to E, wherein the interpolymer comprises (i) at least one piperylene component; (ii) at least one cyclic pentadiene component; and (iii) at least one aromatic component, wherein the interpolymer comprises a softening point from 40° C. to 160° C.

G. The elastomeric composition of any one of embodiments A to F, wherein the at least one elastomer is coupled to the at least one filler.

H. The elastomeric composition of any one of embodiments A to G, wherein the interpolymer is coupled via at least one of the one or more functional groups to the at least one elastomer.

I. The elastomeric composition of any one of embodiments A to H, wherein the interpolymer is coupled via at least one of the one or more functional groups to the at least one filler.

J. The elastomeric composition of any one of embodiments A to G, wherein the interpolymer is coupled to a combination of the at least one elastomer and the at least one filler.

K. The elastomeric composition of any one of embodiments A to J, wherein the interpolymer is immiscible with the at least one elastomer.

L. A tire or tire component comprising the elastomeric composition of embodiment A.

M. A method, comprising:
   (a) melt processing an elastomeric mixture to form an elastomeric composition in the shape of an article, wherein the elastomeric mixture comprises (i) at least one elastomer; (ii) at least one hydrocarbon polymer modifier wherein the hydrocarbon polymer modifier comprises at least one functional group and an interpolymer comprising at least one monomer chosen from piperylenes, cyclic pentadienes, aromatics, limonenes, pinenes, and amylenes, and wherein the one or more functional groups comprise a silane structure; (iii) a filler comprising silica; (iv) a bifunctional organosilane crosslinking agent; and
   (b) curing the elastomeric composition to form the article.

N. The method of embodiment M comprising coupling the interpolymer to one or both of the elastomer and the filler, coupling the elastomer to one or both of the interpolymer and the filler, and coupling the filler to one or both of the interpolymer and the elastomer.

O. The method of embodiment M or embodiment N comprising coupling the filler to a silane functional group of the bifunctional organosilane crosslinking agent and coupling the interpolymer to an organofunctional group of the bifunctional organosilane crosslinking agent.

P. The method of any one of embodiments M to O comprising pre-reacting the interpolymer and the bifunctional organosilane crosslinking agent to provide the interpolymer with the silane functionality.

Q. The method of embodiment P, wherein the pre-reaction comprises contacting the interpolymer and the bifunctional organosilane crosslinking agent in the presence of a catalyst.

R. The method of embodiment P or embodiment Q, wherein the pre-reaction comprises incorporating the bifunctional organosilane crosslinking agent in a mixture of the monomers in a feed to a polymerization reactor.

S. The method of any one of embodiments P to R comprising coupling the pre-reacted interpolymer-bifunctional organosilane crosslinking agent to the filler.

T. The method of any one of embodiments M to S, wherein the bifunctional organosilane crosslinking agent is a silane having the formula:

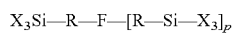

wherein each X is independently a silicon functional group, each R is independently a divalent hydrocarbon group of from 1 to 20 carbon atoms, F is a monovalent or bivalent organo-functional group, p is 0 when F is monovalent and p is 1 when F is divalent.

U. The method of any one of embodiments M to T, wherein the interpolymer comprises at least 1 mol % olefinic hydrogen, based on the total moles of hydrogen in the interpolymer.

V. The method of any one of embodiments M to U, further comprising adhering a build component to a surface of the elastomeric composition and co-curing the build component with the article to form a construct.

W. The method of embodiment V, wherein the construct comprises a tire and the article comprises a tire tread, a tire innerliner, or a tire carcass.

X. A silylated hydrocarbon polymer modifier comprising interpolymerized monomers selected from the group consisting of piperylenes, cyclic pentadienes, aromatics, limonenes, pinenes, amylenes, and combinations thereof, coupled with a bifunctional organosilane crosslinking agent.

Y. A silica-coupled hydrocarbon polymer modifier comprising an interpolymer comprising at least one monomer chosen from piperylenes, cyclic pentadienes, aromatics, limonenes, pinenes, and amylenes, wherein the interpolymer comprises at least 1 mol % olefinic hydrogen, based on the total moles of hydrogen in the interpolymer, coupled to silica via a bifunctional organosilane crosslinking agent.

Z. The silica-coupled hydrocarbon polymer modifier of embodiment Y, wherein the bifunctional organosilane crosslinking agent comprises a silane having the formula:

wherein each X is independently hydroxy or $R^1$—O— wherein $R^1$ is an alkyl, alkoxyalkyl, aryl, aralkyl or cycloalkyl group of up to 20 carbon atoms, R is alkylene of from 1 to 20 carbon atoms, and F is selected from amino, amido, hydroxy, alkoxy, halo, mercapto, carboxy, acyl, vinyl, allyl, styryl, ureido, epoxy, isocyanato, glycidoxy, and acryloxy groups and combinations thereof.

AA. The silica-coupled hydrocarbon polymer modifier of embodiment Y or embodiment Z, wherein the bifunctional organosilane crosslinking agent is a silane having the formula:

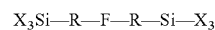

wherein each X is independently hydroxy or $R^1$—O— wherein $R^1$ is an alkyl, alkoxyalkyl, aryl, aralkyl or cycloalkyl group of up to 20 carbon atoms, each R is alkylene of from 1 to 20 carbon atoms, and F is divalent polysulfide of from 2 to 20 sulfur atoms.

BB. The silica-coupled hydrocarbon polymer modifier of any one of embodiments Y to AA, wherein the interpolymer is co-cured with an elastomer via the olefinic unsaturation in the interpolymer.

The invention has been described above with reference to numerous embodiments and specific examples. Many variations will suggest themselves to those skilled in this art in light of the above detailed description. All such obvious variations are within the full intended scope of the appended claims.

We claim:

1. A silylated hydrocarbon polymer modifier comprising interpolymerized monomers comprising at least one piperylene component, at least one cyclic pentadiene component, at least one aromatic component, and optionally at least one monomer selected from the group consisting of limonenes, pinenes, and amylenes, coupled with a bifunctional organosilane crosslinking agent, wherein the interpolymer, prior to functionalization, has a weight average molecular weight of 2500 to 25,000 g/mole, a number average molecular weight of 900 to 3,000 g/mole, and a softening point from 40° C. to 160° C., and wherein the silylated hydrocarbon polymer modifier has a glass transition temperature of from about 60° C. to 100° C.

2. A silica-coupled hydrocarbon polymer modifier comprising the silylated hydrocarbon polymer modifier of claim 1, wherein the interpolymer comprises at least 1 mol % olefinic hydrogen, based on the total moles of hydrogen in the interpolymer, and wherein the interpolymer is coupled to silica via the bifunctional organosilane crosslinking agent.

3. A silylated hydrocarbon polymer modifier comprising interpolymerized monomers comprising at least one piperylene component, at least one cyclic pentadiene component, at least one aromatic component, and optionally at least one monomer selected from the group consisting of limonenes, pinenes, and amylenes, wherein the interpolymer, prior to functionalization, has a weight average molecular weight of 2500 to 25,000 g/mole, a number average molecular weight of 900 to 3,000 g/mole, and a softening point from 40° C. to 160° C., and wherein the silylated hydrocarbon polymer modifier has a glass transition temperature of from about 60° C. to 100° C.

4. The silylated hydrocarbon polymer modifier of claim 3, wherein the interpolymer is coupled with a bifunctional organosilane crosslinking agent.

5. A silica-coupled hydrocarbon polymer modifier comprising the silylated hydrocarbon polymer modifier of claim 4, wherein the interpolymer comprises at least 1 mol % olefinic hydrogen, based on the total moles of hydrogen in the interpolymer, and wherein the interpolymer is coupled to silica via the bifunctional organosilane crosslinking agent.

* * * * *